(12) United States Patent
Liu et al.

(10) Patent No.: US 12,120,430 B2
(45) Date of Patent: Oct. 15, 2024

(54) SYSTEMS AND METHODS FOR IMAGING USING RECONFIGURABLE PARTICLE ASSEMBLIES

(71) Applicant: The Penn State Research Foundation, University Park, PA (US)

(72) Inventors: Zhiwen Liu, State College, PA (US); Christine D. Keating, State College, PA (US); Cheng-Yu Wang, State College, PA (US); Jennifer R. Miller, University Park, PA (US)

(73) Assignee: The Penn State Research Foundation, University Park, PA (US)

( * ) Notice: Subject to any disclaimer, the term of this patent is extended or adjusted under 35 U.S.C. 154(b) by 134 days.

(21) Appl. No.: 17/636,078

(22) PCT Filed: Aug. 21, 2020

(86) PCT No.: PCT/US2020/047398
§ 371 (c)(1),
(2) Date: Feb. 17, 2022

(87) PCT Pub. No.: WO2021/041212
PCT Pub. Date: Mar. 4, 2021

(65) Prior Publication Data
US 2022/0385798 A1   Dec. 1, 2022

Related U.S. Application Data

(60) Provisional application No. 62/890,657, filed on Aug. 23, 2019.

(51) Int. Cl.
*H04N 23/72* (2023.01)
*G02B 5/02* (2006.01)
(Continued)

(52) U.S. Cl.
CPC .......... *H04N 23/72* (2023.01); *G02B 5/0242* (2013.01); *H04N 23/56* (2023.01); *H04N 23/71* (2023.01)

(58) Field of Classification Search
CPC ........ H04N 23/72; H04N 23/56; H04N 23/71; G02B 5/0242; G02B 5/02; G02B 5/04;
(Continued)

(56) References Cited

U.S. PATENT DOCUMENTS 7,819,542 B2   10/2010   Sato
9,605,941 B2    3/2017   Ozcan et al.
(Continued)

OTHER PUBLICATIONS

Edwards et al., Controlling Colloidal Particles with Electric Fields, Downloaded via Pennsylvania State Univ on Oct. 27, 2022 at 15:50:14 (UTC), 11 pages.
(Continued)

*Primary Examiner* — Daquan Zhao
(74) *Attorney, Agent, or Firm* — DINSMORE & SHOHL LLP

(57) ABSTRACT

An imaging system includes a scattering assembly with a scattering medium positioned a first distance from an object to be imaged. The scattering medium includes a plurality of particles suspended in a suspension medium and at least one field source generating an electromagnetic field to manipulate an orientation, concentration, spatial distribution, and/or other properties of the plurality of particles. The imaging system further includes a detector including a plurality of detector elements positioned a second distance from the scattering medium and an image processing system configured to reconstruct an image of the object from an object image signal detected by the detector using object light scattered by the scattering medium and incident on the detector.

19 Claims, 13 Drawing Sheets

(51) Int. Cl.
    *H04N 23/56*     (2023.01)
    *H04N 23/71*     (2023.01)
    *G02B 5/04*     (2006.01)

(58) Field of Classification Search
    CPC ... G02B 1/00; G02B 5/00; G02B 5/12; G02B 5/18; G02B 6/00; G02B 7/00; G02B 9/00; G02B 11/00
    USPC .............................................. 348/61, 68, 135
    See application file for complete search history.

(56) References Cited

U.S. PATENT DOCUMENTS

| | | | |
|---|---|---|---|
| 10,753,869 | B2 | 8/2020 | Veeraraghavan et al. |
| 2006/0044448 | A1* | 3/2006 | Kato ...................... H04N 23/68 |
| | | | 348/335 |
| 2009/0095912 | A1 | 4/2009 | Slinger |
| 2009/0214166 | A1* | 8/2009 | Huang ................. G02B 6/2555 |
| | | | 219/121.45 |
| 2016/0363527 | A1 | 12/2016 | Ruan et al. |
| 2018/0010961 | A1 | 1/2018 | Masumura |
| 2018/0027201 | A1 | 1/2018 | Sankaranarayanan et al. |

OTHER PUBLICATIONS

Antipa et al., DiffuserCam: lensless single-exposure 3D imaging, Department of Electrical Engineering & Computer Sciences, University of California, Berkeley, California 94720, USA, *Corresponding author: lwaller@alum.mit.edu, 9 pages.
Donahue et al., Controlling Disorder by Electric-Field-Directed Reconfiguration of Nanowires to Tune Random Lasing, Departments of †Electrical Engineering and ‡Chemistry, and the §Materials Research Institute, Pennsylvania State University, University Park, Pennsylvania 16802, United States, 9 pages.
Park et al., Disordered Optics: Exploiting Multiple Light Scattering and Wavefront Shaping for Nonconventional Optical Elements, Downloaded from https://onlinelibrary.wiley.com/doi/10.1002/adma.201903457 by Pennsylvania State University, Wiley Online Library on [Oct. 27, 2022]. 16 pages.
Furst, Eric M., Directed self-assembly, Published on Aug. 27, 2013. Downloaded on Oct. 27, 2022 4:51:41 PM, 7 pages.
Vellekoop et al., Exploiting disorder for perfect focusing, Published Online: Feb. 14, 2010 | DOI: 10.1038/NPHOTON.2010.3, 3 pages.
Solomon, Michael J., Tools and Functions of Reconfigurable Colloidal Assembly, Langmuir 2018, 34, 11205-11219, 15 pages.
Singh et al., Exploiting scattering media for exploring 3D objects, Light: Science & Applications (2017), Official journal of the CIOMP 2047-7538/17, 7 pages.
Smith et al., Electric-field assisted assembly and alignment of metallic nanowires, Appl. Phys. Lett. 77, 1399 (2000); https://doi.org/10.1063/1.1290272, Submitted: Mar. 27, 2000 • Accepted: Jul. 12, 2000 • Published Online: Aug. 22, 2000, 4 pages.
Choi et al., Overcoming the Diffraction Limit Using Multiple Light Scattering in a Highly Disordered Medium, Received Feb. 27, 2011; revised manuscript received Apr. 26, 2011; published Jul. 6, 2011, 4 pages.
Sioss et al., Batch Preparation of Linear Au and Ag Nanoparticle Chains via Wet Chemistry, Department of Chemistry, PennsylVania State University, University Park, Pennsylvania 16802, 5 pages.
Jung-Hoon Park et al., Subwavelength light focusing using random nanoparticles, Published Online: Apr. 28, 2013 | DOI: 10.1038/NPHOTON.2013.95, 5 pages.
Isikman et al., Color and monochrome lensless on-chip imaging of Caenorhabditis elegans over a wide field-of-view, Lab Chip. May 7, 2010; 10(9): 1109-1112. doi:10.1039/c001200a, 9 pages.
Benjamin D. Smith et al., Vertical Arrays of Anisotropic Particles by Gravity-Driven Self-Assembly, Downloaded from https://onlinelibrary.wiley.com/doi/10.1002/smll.201002233 by Pennsylvania State University, Wiley Online Library on [Oct. 27, 2022], 8 pages.
Greenbaum, Alon et al., Imaging without lenses: achievements and remaining challenges of wide-field on-chip microscopy, 2012 Nature America, Inc., 7 pages.
Adams et al., Single-frame 3D fluorescence microscopy with ultraminiature lensless FlatScope, 2017 The Authors, some rights reserved; exclusive licensee American Association for the Advancement of Science. No claim to original U.S. Government Works. Distributed under a Creative Commons Attribution NonCommercial License 4.0 (CC BY-NC), 10 pages.
Min, Jouha et al., Computational Optics Enables Breast Cancer Profiling in Point-of-Care Settings, ACS Nano 2018, 12, 9081-9090, 10 pages.
Garcia-Sucerquia, Jorge et al., Digital in-line holographic microscopy, Applied Optics, vol. 45, No. 5, Feb. 10, 2006, 15 pages.
Greenbaum, Alon et al., Field-portable wide-field microscopy of dense samples using multi-height pixel super-resolution based lensfree imaging, Lab Chip, 2012, 12, 1242, 4 pages.
Stubaueva, Gulnaz et al., Lensfree Holographic Imaging of Antibody Microarrays for High-Throughput Detection of Leukocyte Numbers and Function, Anal. Chem. 2010, 82, 3736-3744, 9 pages.
Deweert, Michael et al., Lensless coded-aperture imaging with separable Doubly-Toeplitz masks, https://www.spiedigitallibrary.org/journals/Optical-Engineering on Oct. 27, 2022, 10 pages.
Boominathan, Vivek, Lensless Imaging, Date of publication: Sep. 2, 2016, 13 pages.

* cited by examiner

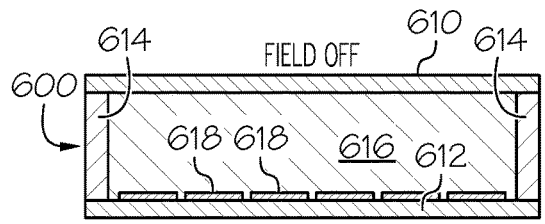
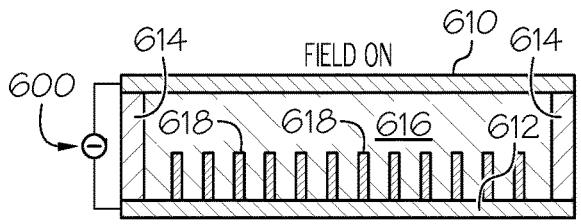
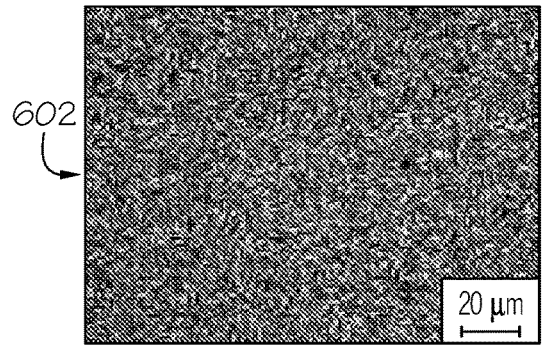
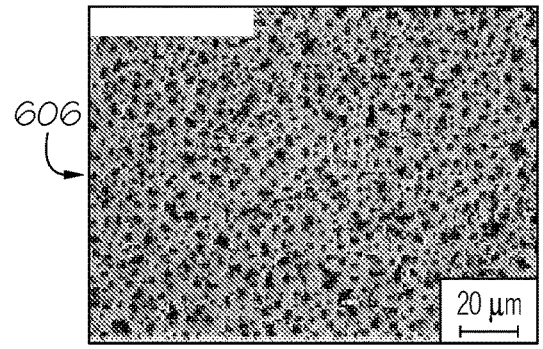
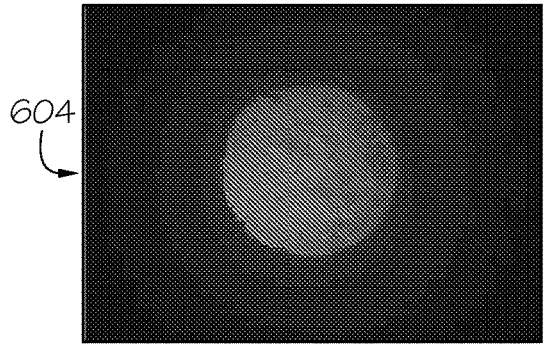
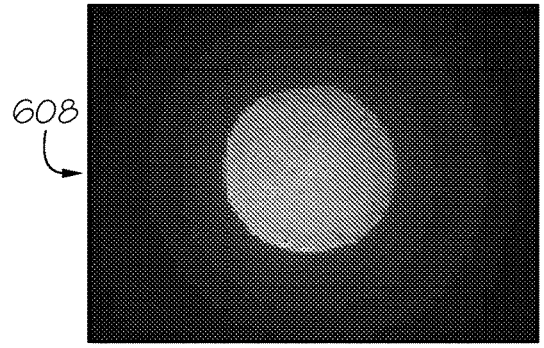
FIG. 6A　　　　　　　　　　　　FIG. 6B
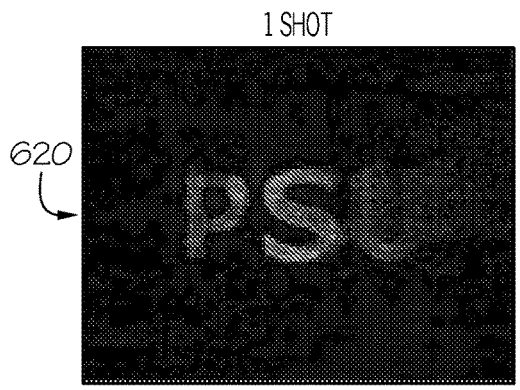
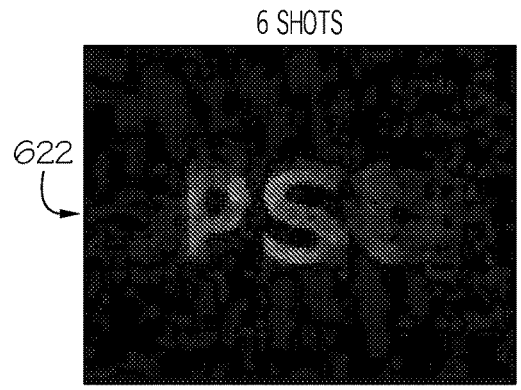
FIG. 6C　　　　　　　　　　　　FIG. 6D

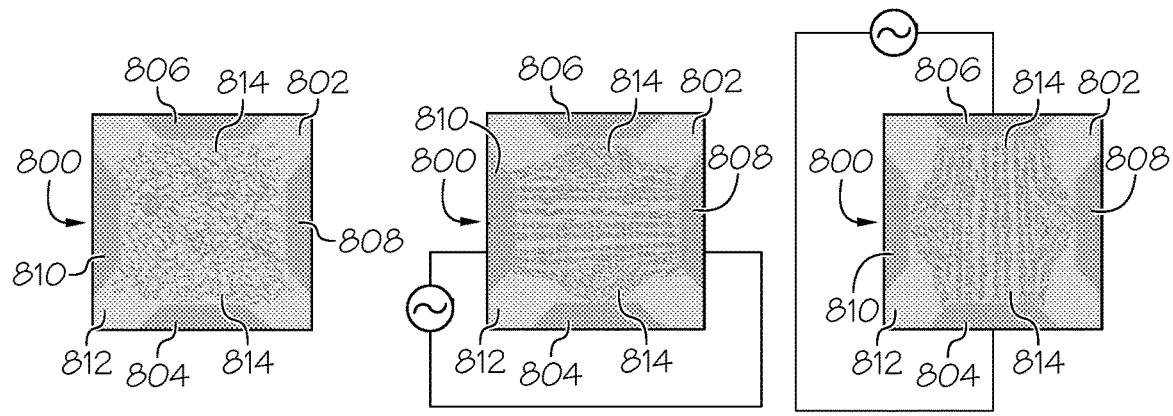
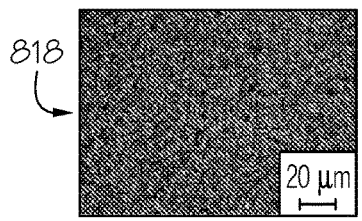 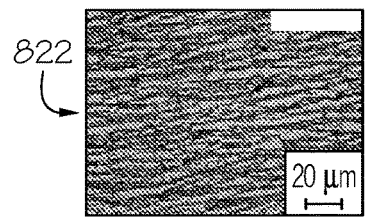 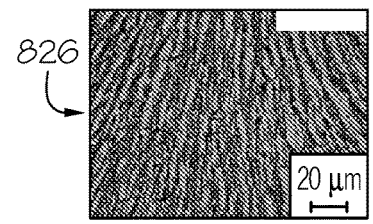
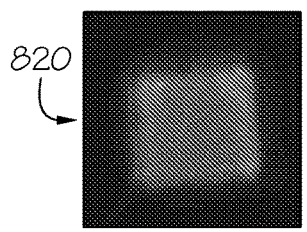 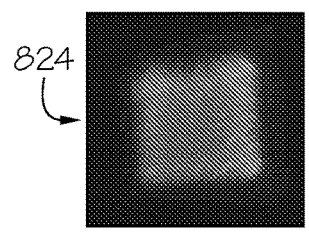 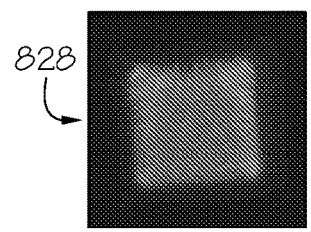
FIG. 8A      FIG. 8B      FIG. 8C
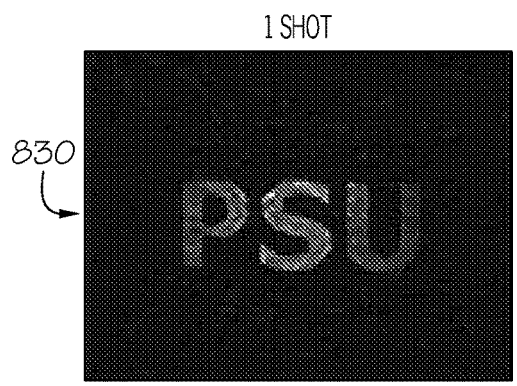 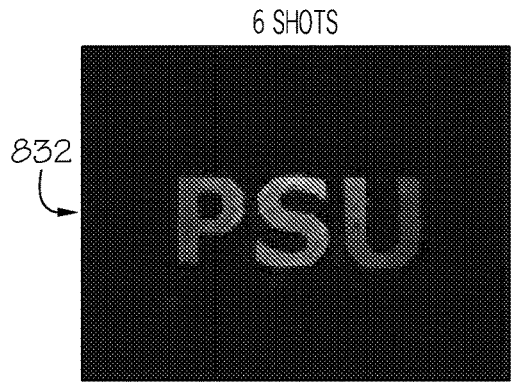
FIG. 8D      FIG. 8E

SYSTEMS AND METHODS FOR IMAGING USING RECONFIGURABLE PARTICLE ASSEMBLIES

REFERENCE TO RELATED APPLICATION

This application is the U.S. National Stage of PCT/US2020/047398 filed Aug. 21, 2020, which claims priority to U.S. Provisional Patent Application Ser. No. 62/890,657, filed Aug. 23, 2019, the entire content of both are incorporated herein by reference in their entirety.

GOVERNMENT SUPPORT

This invention was made with government support under Grant No. DMR1420620 awarded by the National Science Foundation. The Government has certain rights in the invention

BACKGROUND OF THE INVENTION

Field

The present disclosure generally relates to systems and/or methods for imaging using reconfigurable particle assemblies through field-directed manipulation of a scattering medium.

Technical Background

Lens-based imaging systems are commonplace in imaging systems. For example, a lens may focus light emanating from an object to reproduce an image of the object at a detector to facilitate reproduction of the object information based on imaging signals produced by the detector. The focusing ability of optical lenses facilitates reproduction of object information at high resolution and the creation of quality images. Lens-based systems, however, suffer from several limitations, including size constraints (e.g., a device must be large enough to contain the lens), relatively small fields of view (FOV), and high cost.

SUMMARY OF THE INVENTION

In one embodiment, an imaging system includes a scattering assembly with a scattering medium positioned a first distance from an object to be imaged. The scattering medium includes a plurality of particles suspended in a suspension medium and at least one field source generating an electromagnetic field to manipulate an orientation, concentration, spatial distribution, and/or other properties of the plurality of particles. The imaging system further includes a detector including a plurality of detector elements positioned a second distance from the scattering medium and an image processing system configured to reconstruct an image of the object from an object image signal generated by the detector using object light scattered by the scattering medium and incident on the detector.

In another embodiment, a method of generating an image of an object includes placing the object within a field of view of an imaging system, the imaging system including a scattering assembly having a scattering medium in a first scattering medium configuration, the scattering medium positioned a first distance from the object along a light propagation direction, the scattering medium including a plurality of particles suspended in a suspension medium and at least one field source. The scattering assembly also includes a detector positioned a second distance from the scattering medium along the light propagation direction, the detector including a plurality of detector elements. The method also includes scattering object light from the object in the scattering medium while the scattering medium is in the first scattering medium configuration. The method also includes measuring the scattered object light with the detector to generate a first object image signal. The method also includes illuminating the scattering assembly with point illumination light from a point illumination source while the scattering medium is in the first scattering medium configuration. The method also includes measuring scattered point illumination light with the detector to generate a first point source image signal, wherein the first object image signal and the first point source image signal form a first object image signal-point source image signal pair. The method also includes reconstructing the image of the object using the first object image signal with the first point source image signal.

In another embodiment, a method of generating an image of an object includes placing the object within a field of view of an imaging system, the imaging system including a scattering assembly comprising a scattering medium positioned a first distance from the object along a light propagation direction, the scattering medium including a plurality of particles suspended in a suspension medium. The imaging system also includes a detector positioned a second distance from the scattering medium along the light propagation direction, the detector comprising a plurality of detector elements. The method also includes scattering object light from the object in the scattering medium while the scattering medium is in a plurality of different scattering medium configurations and measuring scattered object light from each of the scattering medium configurations to generate a plurality of object image signals. The method also includes, with the scattering medium in each of the plurality of different scattering medium configurations, illuminating the scattering assembly with point illumination light from a point illumination source to generate a plurality of point source image signals. The method also includes reconstructing the image of the object from the plurality of object image signals and the plurality of point source image signals using a multi-shot method.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 6A depicts an example scattering assembly for an imaging system having a first scattering medium configuration, a first object image signal, and a first point source image signal, according to one or more embodiments described herein;

FIG. 6B depicts the scattering assembly shown in FIG. 6A having a second scattering medium configuration, a second object image signal, and a second point source image signal, according to one or more embodiments described herein;

FIG. 6C depicts an image of an object generated via the scattering assembly depicted in FIGS. 6A and 6B constructed using a single shot method, according to one or more embodiments described herein;

FIG. 6D depicts an image of an object generated via the scattering assembly depicted in FIGS. 6A and 6B constructed using a multi-shot method, according to one or more embodiments described herein;

FIG. 8A depicts another example scattering assembly for an imaging system having a first scattering medium configuration, a first object image signal, and a first point source image signal, according to one or more embodiments described herein;

FIG. 8B depicts the scattering assembly shown in FIG. 8A having a second scattering medium configuration, a second object image signal, and a second point source image signal, according to one or more embodiments described herein;

FIG. 8C depicts the scattering assembly shown in FIG. 8A having a third scattering medium configuration, a third object image signal, and a third point source image signal, according to one or more embodiments described herein;

FIG. 8D depicts an image of an object generated via the scattering assembly depicted in FIGS. 8A, 8B, and 8C constructed using a single shot method, according to one or more embodiments described herein;

FIG. 8E depicts an image of an object generated via the scattering assembly depicted in FIGS. 8A, 8B, and 8C constructed using a multi-shot method, according to one or more embodiments described herein;

DETAILED DESCRIPTION OF THE INVENTION

The present disclosure relates to systems and methods for imaging using field-directed configuration of a scattering medium and methods pertaining to the same. In various embodiments, a particle-assembly based imaging system may include a point illumination source, a scattering assembly, and a detector. The point illumination source may be separated from a scattering medium of the scattering assembly by a first distance in a light propagation direction, and the scattering medium may be separated from the detector by a second distance in the light propagation direction. The scattering assembly may include a reservoir, a suspension medium, at least one field source, and a plurality of particles suspended within the suspension medium. To generate an image of an object, an electromagnetic field may be generated by the at least one field to cause self-assembly of the plurality of particles into a plurality of scattering elements. Light emanating from the object may be scattered by the plurality of scattering elements formed by the suspended particles to form an object image signal that is incident on the detector. The point illumination source may then illuminate the plurality of scattering elements to generate a point source image signal. In embodiments, the object image signal is de-convolved with the point source image signal to generate an image of the object.

The scattering assembly is highly configurable in that the specific optical response produced thereby may be adjusted by tuning the electromagnetic field generated by the at least one field source. For example, in embodiments, the at least one field source comprises an electrode pair and a power source applying a time-varying voltage differential (e.g., an alternating current voltage) across the electrode pair. In such embodiments, the optical response of the imaging system may be adjusted by tuning the geometry of the electrode pair, the orientation of the electrode pair to which voltage is supplied, the magnitude, frequency and waveform of the applied voltage, the size, shape and material of the particles, and the suspension medium. Such configurability facilitates the recording of multiple object image signal-point source image signal pairs using different scattering medium configurations (e.g., patterns of scattering elements) per pair, thus obtaining additional object information for each pair.

Figure 1:
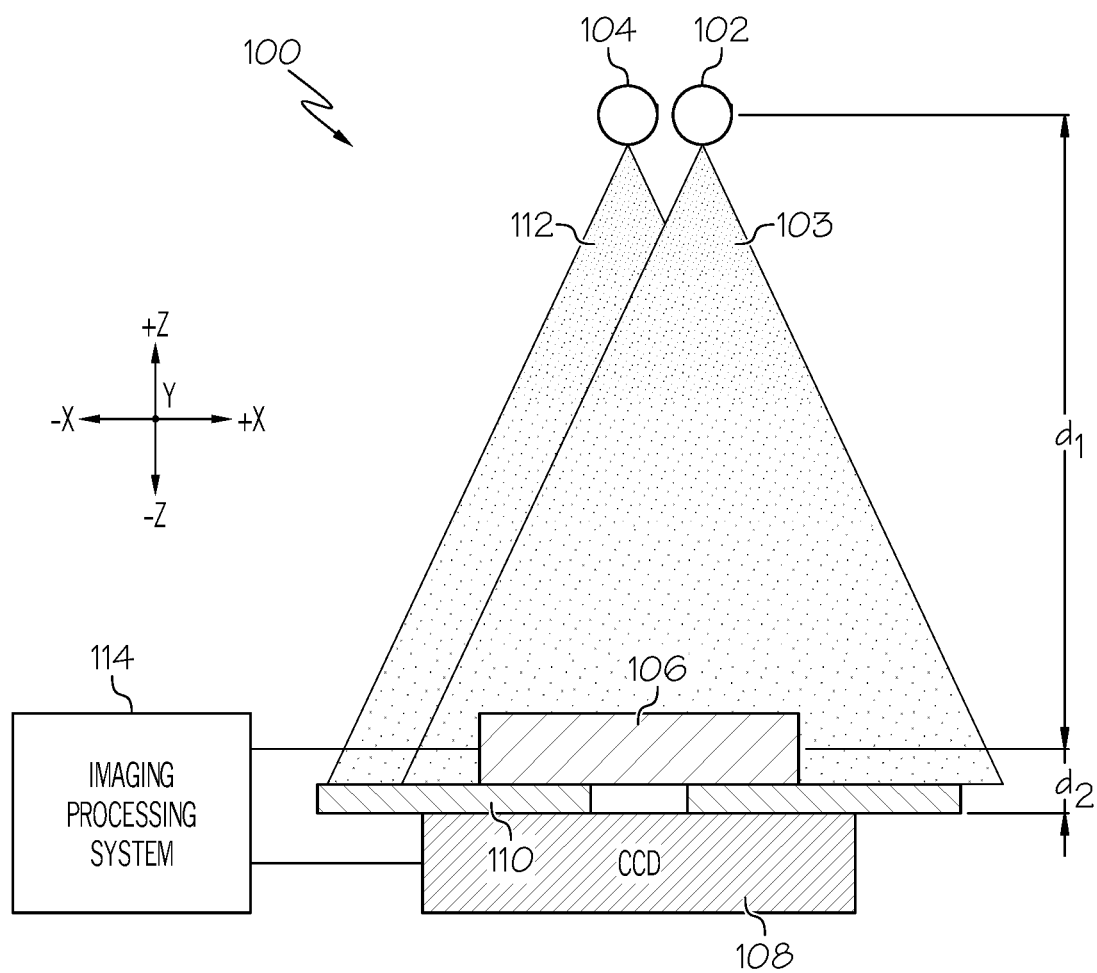
FIG. 1 schematically depicts an imaging system, according to one or more embodiments described herein.

Referring now to FIG. 1, an imaging system 100 is schematically depicted according to an example embodiment. The imaging system 100 generates an image of an object 102 placed within a field of view ("FOV") of a detector 108 through use of a re-configurable scattering mask pattern formed within a scattering assembly 106 disposed between the object 102 and the detector 108. An image processing system 114 is configured to generate image responses of the imaging system 100 to various illumination sources and configurations of the scattering assembly 106 (e.g., generate the object image signals, the point source image signals, and the images of the objects reconstructed from the object image signals and the point source image signals described herein).

Prior to getting into functional details of the remaining components of FIG. 1, the image processing system 114 may include one or more components including a non-transitory computer-readable medium for completing the various features and/or functionalities described herein, embodied as hardware, software, and/or firmware, according to aspects shown and described herein. According to some aspects, the image processing system 114 may be configured as a general purpose computer with the requisite hardware, software and/or firmware. According to other aspects, the image processing system 114 may be configured as a special purpose computer (e.g., a particular machine) designed specifically to perform the features and/or functionalities as described herein. Here, it should be generally understood that the image processing system 114 may be one computing device or system or a plurality of computing devices or systems. Each system may include a processor, input/output hardware, network interface hardware, a data storage component, and a memory component configured as volatile or non-volatile memory including RAM (e.g., SRAM, DRAM, and/or other types of random access memory), flash memory, registers, compact discs (CDs), digital versatile discs (DVD), and/or other types of storage components. The memory component may include operating logic or program instructions that, when executed, perform the features and/or functionalities described herein. The processor may include any processing component configured to receive and execute instructions (e.g., operating logic or program instructions from the data storage component and/or memory component) to perform the features and/or functionalities described herein. Network interface hardware may include any wired/wireless hardware generally known to those of skill in the art for communicating with other networks and/or devices.

Referring again more generally to the imaging system 100, the object 102 is disposed a first distance $d_1$ from a center (or scattering medium) of the scattering assembly 106. The scattering assembly 106 (e.g., a scattering medium thereof) is disposed a second distance $d_2$ from a detection plane of the detector 108. Examples of the scattering assembly 106 are described in greater detail herein. As depicted, object light 103 in the form of an object point source propagates from the object 102 towards the scattering assembly 106 and the detector 108 in a light propagation direction (e.g., the negative Z-direction). While the object light 103 is depicted in the form of an object point source, it should be appreciated that the object light 103 is depicted as such for purposes of explanation only and that the totality of object light 103 incident on the scattering assembly 106 and the detector 108 may include light scattering or otherwise originating from an entirety of the object 102.

In embodiments, the object 102 includes a light source and the object light 103 propagates directly from the object towards the scattering assembly 106 in a light propagation direction (e.g., in the negative Z-direction). In embodiments, the object 102 is not an independent light source and the object light 103 is reflected, scattered, or otherwise redirected from the object 102 in the light propagation direction towards the scattering assembly 106. The scattering assembly 106 includes a scattering medium that scatters the object light 103 prior to the object light 103 exiting the scattering assembly 106. It should be appreciated that the arrangement of the components of the imaging system 100 depicted in FIG. 1 is exemplary only and various other configurations are contemplated and within the scope of the present disclosure. For example, the embodiment depicted in FIG. 1 is a transmission geometry where light that is scattered by the scattering medium of the scattering assembly 106, propagates through the scattering assembly 106, and measured by the detector 108. Reflection geometries are also envisioned where the detector 108 is positioned to measure object light 103 that backscatters off the scattering medium of the scattering assembly 106. In such embodiments, the detector 108 may be positioned the same side of the scattering assembly 106 as the object 102. Moreover, embodiments described more fully herein relate to imaging embodiments of the imaging system 100 where the imaging system 100 does not include an imaging optical element (e.g., a lens) producing an image of the object. Embodiments of the present disclosure may further include at least one imaging optical element that maps the object light onto the detector 108. For example, embodiments may include an imaging optical element disposed between the object 102 and the scattering assembly 106. The scattering assembly 106 may improve performance over an imaging system incorporating only the imaging optical element by facilitating the capture of high spatial frequency components of the object 102.

Upon being scattered by the scattering assembly 106, the object light 103 propagates through an aperture 110 to the detector 108. In embodiments, the detector 108 includes a plurality of detector elements (e.g., charge-coupled devices ("CCDs"), complementary metal-oxide-semiconductor ("CMOS") devices, or the like) arranged in an array (e.g., a planar array) extending perpendicularly to the light propagation direction. As such, object light 103 originating from a particular point on the object 102 that is scattered via the scattering assembly 106 and propagates through the aperture 110 may be incident on one of the detector elements to generate an imaging signal representing an illumination energy integrated over the entirety of the surface of that detector element. The image processing system 114 may process a plurality of such imaging signals to generate an object image signal based on the light incident on the detector 108 within a particular image frame.

As described herein, the scattering assembly 106 generally includes a re-configurable scattering medium. In embodiments, the scattering medium comprises a plurality of particles disposed in a suspension medium having orientations, concentrations, spatial distributions and other properties that can be manipulated in at least one aspect by exposure to an electromagnetic field. Particles of various different sizes, shapes, and materials may be used in the plurality of particles of the scattering medium 106. In embodiments, the plurality of particles are micro-particles having a size (e.g., length, diameter, radius, and the like) of greater than or equal to 1 µm. In embodiments, the plurality of particles are nanoparticles having a size of less than or equal to 100 nm. In embodiments, the plurality of particles are particles having a size of larger than or equal to 100 nm and less than or equal to 1 µm. Particles of other sizes may also be used. In embodiments, a combination of particles having various different sizes and/or shapes may be used in the plurality of particles. In embodiments, the plurality of particles are constructed at least in part from an electrically conductive material. In embodiments, the plurality of particles are constructed at least in part from a semiconducting material. In embodiments, the plurality of particles are constructed at least in part from an electrically insulating material. In embodiments, combinations of such materials are used to construct the plurality of particles. In embodiments, the scattering medium of the scattering assembly 106 includes an alternative scattering medium to the plurality of particles. For example, in embodiments, the scattering assembly 106 includes a plurality of droplets that may be manipulated in terms of orientation and/or distribution through application of an electromagnetic field or other tunable force. Any scattering medium that is reconfigurable and capable of scattering object light 103 for image differentiation may be used consistent with the present disclosure.

As used herein, the term "scattering medium configuration" refers to a general arrangement of the scattering medium within the scattering assembly 106 produced when the scattering medium is subjected to an electromagnetic field defined with a specific set of parameters (e.g., magnitude, frequency, waveform, orientation relative to the light propagation direction, and the like). For example, the scattering assembly 106 may have a first scattering medium configuration in the presence of no electromagnetic field (e.g., associated with zero amplitude), a second scattering medium configuration when the scattering medium is subjected to a first electromagnetic field (e.g., in the x-direction), and a third scattering medium configuration when the scattering medium is subjected to a second electromagnetic field (e.g., in the y-direction). Specifics regarding a particular scattering medium configuration may depend on the scattering medium (e.g., particles therein) and electromagnetic field source used. Examples of particular scattering medium configurations that are compatible with the imaging system 100 are described in greater detail herein. Generally, the object light 103 is scattered in a manner that is dependent on the scattering medium configuration of the scattering assembly 106 at the time when the object light 103 is incident on the scattering assembly 106.

Information regarding the object 102 contained in the object light 103 is retained in the light scattered via the scattering assembly 106, but is encoded due to the scattering caused by the particular scattering medium configuration of the scattering assembly 106. As a result, an image based solely on scattered object light 103 may not directly reveal significant amounts of information directly representing the object 102.

In embodiments, the scattering assembly 106 includes a scattering medium having a thickness in the light propagation such that the imaging system 100 employs a memory effect (i.e., the imaging system 100 is a shift-invariant system). In embodiments, the thickness for the scattering medium is greater than or equal to 10 nm and less than or equal to 1000 µm. In embodiments, the thickness for the scattering medium is selected based on a correlation factor $C(\Phi)$ that varies as a function of angle of incidence $\Phi$ with the scattering medium. In embodiments, the thickness L corresponds to the thickness of individual particles within the scattering assembly 106. The memory effect is beneficial in that a lateral shift in an image of the object 102 does not change the shape of the scattering pattern formed on the detector 108, but only laterally shifts the relative position of the scattering pattern on the detector 108. Such a shift-invariant system allows the response m of the imaging system 100 to an object x to be modeled as $$m = h * x \qquad (1)$$

where h is an impulse response (or point source image signal) of the imaging system to a point illumination source and * is the convolution operator. Thus, to reconstruct an image of the object 102 from a scattered image response m measured by the detector 108, the measured image signal m may be de-convolved from the impulse response h if the impulse response of the imaging system 100 with the scattering assembly 106 having a particular scattering configuration is known.

Accordingly, the imaging system 100 includes a point illumination source 104 that emits point illumination light 112 in the light propagation direction towards the scattering assembly 106. The point illumination source 104 is located at the first distance $d_1$ from the center (or scattering medium) of the scattering assembly 106. In other words, the point illumination source 104 is located at the same distance from the scattering assembly 106 in the light propagation direction as the object 102. The point illumination source 104 is a light source that approximates a point source within the imaging system 100. In embodiments, the point illumination source 104 is a light source disposed at the location of the point illumination source 104 depicted in FIG. 1. In embodiments, the point illumination source 104 includes a light source having a smaller cross-sectional area in the plane perpendicular to the light propagation direction (e.g., the X-Y plane) than the object 102. In embodiments, the point illumination source 104 includes a light source where light originates from a smaller cross-sectional area in the plane perpendicular to the light propagation direction (e.g., the X-Y plane) than one of the detector elements of the detector 108. In embodiments, the point illumination source 104 includes a light source having a size (e.g., diameter, width, etc.) that is greater than or equal to 100 nm and less than or equal 5 µm. In an example, the point illumination source 104 is a disc-shaped light source having a diameter of approximately 5 µm.

In embodiments, the point illumination source 104 is an optical fiber emitting the point illumination light 112. In embodiments, the point illumination source 104 comprises a focused light beam from an external illumination source (not depicted) disposed more distant from the scattering assembly 106 than the point illumination source 104. For example, an optical assembly including a focusing element (e.g., a lens, mirror, or the like) may be used to focus the light from the external illumination source to a relatively small size at the location of the point illumination source 104 depicted in FIG. 1. In embodiments, the point illumination source 104 includes an aperture (not depicted) that restricts the size of the point illumination source 104 within a FOV of the detector 108.

Referring still to FIG. 1, while the point illumination source 104 is depicted to be offset from the object 102 in a direction perpendicular to the light propagation direction (e.g., the X-direction), it should be understood that alternative configurations for the point illumination source 104 are contemplated and within the scope of the present disclosure. For example, in embodiments, after an image of the scattered object light 103 is captured by the detector 108, the object 102 is removed from the FOV of the detector 108 and the point illumination source 104 is positioned at the same point in space as the object 102 for subsequent processing. In such embodiments, the point illumination source 104 (e.g., a tip of an optical fiber) may be located at the same point as a geometric center of the object 102. Another configuration of the point illumination source 104 is described in greater detail herein with respect to FIG. 3.

In embodiments, the point illumination source 104 emits light within a spectral range that at least partially overlaps that of the object light 103. For example, in embodiments, the object light 103 may include light throughout the visible spectrum (e.g., greater than or equal to 380 nm and less than or equal to 740 nm). In such embodiments, the point illumination source 104 emits light within the visible spectrum. The bandwidth of the point illumination light 112 may vary depending on the implementation. In embodiments, the point illumination source 104 may emit or include light having a single wavelength λ. In embodiments, the point illumination source 104 may emit or include light having some bandwidth centered about the wavelength λ. In embodiments, there is a one-to-one correspondence between the spectral band of the object light 103 and the point illumination light 112. In embodiments, the point illumination source 104 the object light 103, or both can be broadband light (e.g., white light). In embodiments, the wavelength of the light can be in the mid-IR or other wavelength range. In embodiments, the point illumination source 104 may emit light covering a spectral band that differs from that of the object light.

The point illumination light 112 from the point illumination source 104 is incident on the scattering assembly 106 when the scattering medium therein is in the same scattering medium configuration as when the object light 103 (e.g., either before the object light 103 is incident on the scattering assembly 106 or after the object light 103 is incident on the scattering assembly 106) is incident on the scattering assembly 106. The impulse response h in equation 1 above is then recorded as the response of the detector 108 to the point illumination source 104.

In a case of a non-coherent light source, the object 102 may be represented as a plurality of point sources individually emitting light that is scattered by the scattering medium of the scattering assembly 106 to produced scattered optical signals that overlap with one another on the detector 108. Such overlapping of scattering signals facilitates the utilization of equation 1 above to reconstruct the object 102 from a measured response of the imaging system 100 when the scattering assembly 106 has a particular scattering medium configuration. That is, deconvolution techniques may be used to reconstruct an image of the object 102 in the event that an object response—impulse response pair for a particular scattering medium configuration of the imaging system 100 is known. In embodiments, equation 1 may be solved by the image processing system 114 (e.g., by de-convolving the measured image response m and the impulse response h using numerical methods such as inverse Fourier transform (IFT) or Wiener filter) with a single pair of m and h. However, the efficacy of such techniques may be limited by the amount of information captured by the measurements of m and h. The presence of noise may render additional a priori information regarding the object light 103 such as sparsity necessary to obtain high resolution images.

Accordingly, in embodiments, the imaging system 100 may utilize a multi-shot technique to overcome such constraints of other de-convolution techniques. Such multi-shot techniques may utilize information taken from multiple pairs of m and h measurements. In embodiments, at least two of the pairs of m and h measurements may be taken using a different scattering medium configuration of the scattering assembly 106. To facilitate the utilization of such multi-shot techniques, the scattering medium of the scattering assembly 106 is designed such that different scattering medium configurations yield sufficiently different image responses such that additional information regarding the object 102 is recorded in each pair of m and h measurements.

In order to yield sufficiently different measured responses to utilize multi-shot deconvolution techniques, the scattering medium of the scattering assembly 106 may include scattering elements having sufficient scattering cross-sections such that higher spatial frequency contents of the object light 103 may be mapped into a lower-spatial-frequency Fourier window detectable by the image detector. To model the imaging system, before the scattering assembly 106, the electric field of light emanating from the point illumination source 104 (i.e., the point illumination light 112) may be modeled as an ideal scalar spherical wave:

$$E = \frac{1}{r} e^{ikr} \tag{2}$$

where $$k = \frac{2\pi n}{\lambda},$$

with n being the refractive index of the environment of the imaged object (e.g., n=1 for air), and λ being the vacuum wavelength of the object light 103 (assumed to be quasi-monochromatic). After scattering via the scattering medium of the scattering assembly 106, the scattered light is represented as $$E_s = \text{crop}(E \cdot S) \quad (3)$$

where S is the transmission function of the scattering assembly 106, and crop is the cropping function in accordance with the aperture 110 disposed between scattering assembly 106 and the detector 108. The scattered light represented by $E_s$ then propagates the distance $d_2$ through free space until being incident on the detector 108. As such, the point spread function (PSF) intensity pattern on the detector under the paraxial approximation is then given by $$\text{PSF} = |F^{-1}[F(E_s) \cdot e^{-i\pi\lambda d_2(f_x^2 + f_y^2)}]|^2 \quad (4)$$

where $f_x$ and $f_y$ are spatial frequencies of the electric field, and F and $F^{-1}$ are the Fourier and inverse Fourier transform operators, respectively. To generate high resolution images of the object 102, high spatial frequency $f_x$ and $f_y$ components of the electric field E may be measured via the detector 108.

The resolution of the imaging system 100 can be estimated using geometric arguments based on the first and second distances $d_1$ and $d_2$ and a size of the individual detector elements of the detector 108 in a plane perpendicular to the light propagation direction (e.g., in the X-Y plane), termed $s_d$ herein. Given the shift-invariant nature of the imaging system 100, a lateral shift $\Delta x_o$ of the point illumination source 104 on the object plane (e.g., a shift in the X-Y plane in which the object is placed so as to maintain the distances $d_1$ and $d_2$) results in a lateral shift $\Delta x_i$ in the PSF measured by the detector given by $$\Delta x_i = \frac{d_1}{d_2} \Delta x_i \quad (5)$$

As such, the minimum resolvable lateral shift of the imaging system is given by $d_1/d_2 \cdot s_d$, or the ratio of the first distance $d_1$ to the second distance $d_2$, multiplied by the detector element size $s_d$. Given this, the closer the object 102 is placed towards the scattering assembly 106 (i.e., the smaller the first distance $d_1$), the smaller minimum resolvable distance of the imaging system and the higher the resolution.

The scattering assembly 106 utilizes a scattering medium that is both reconfigurable between a plurality of different scattering medium configurations and contains scattering elements having sufficient scattering cross-sections such that the different scattering medium configurations produce sufficiently different imaging responses in the detector 108 in order for the multi-shot de-convolution techniques described herein to be used.

Figure 2A:
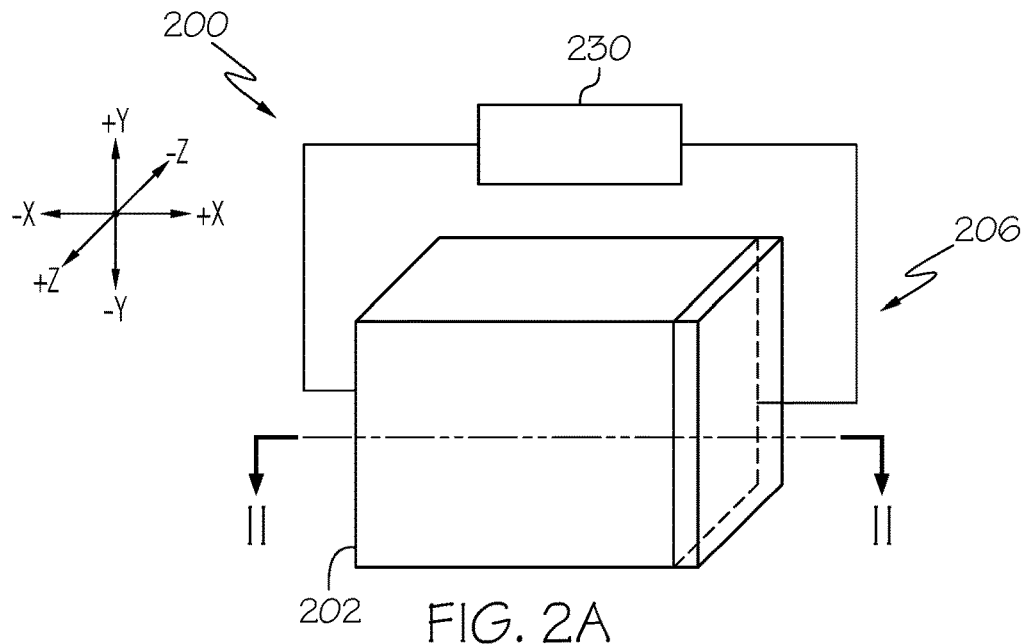
FIG. 2A schematically depicts a scattering assembly for an imaging system, according to one or more embodiments described herein.
Figure 2B:
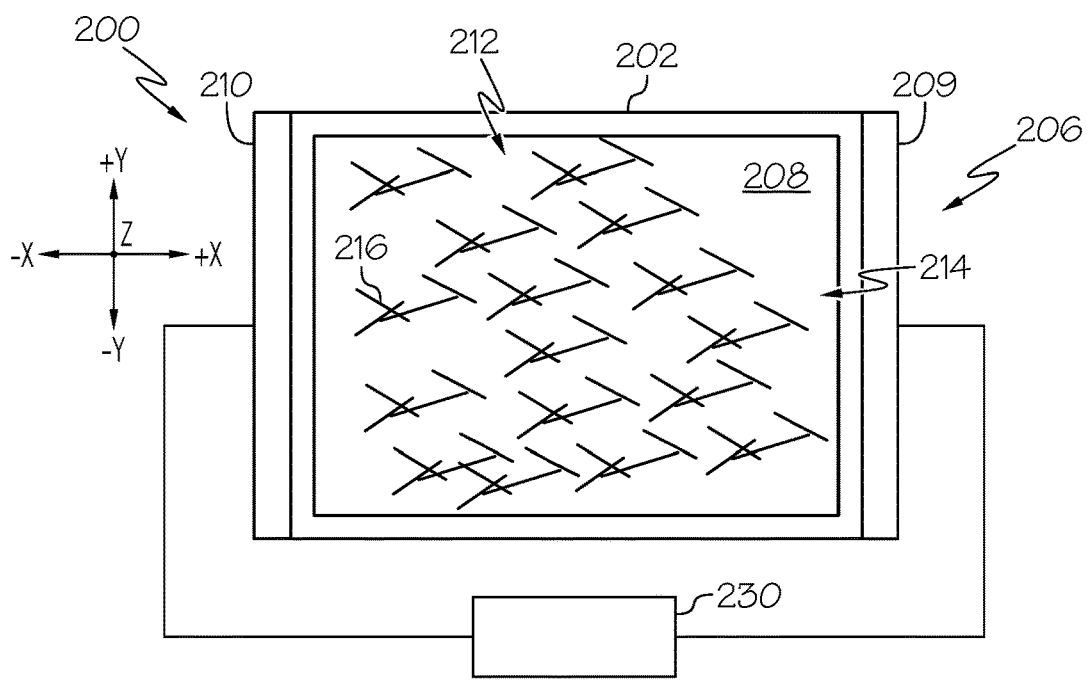
FIG. 2B schematically depicts a cross-sectional view of the scattering assembly depicted in FIG. 2A, according to one or more embodiments described herein.

Referring now to FIGS. 2A and 2B, a scattering assembly 200 is schematically depicted. FIG. 2A depicts a perspective view of the scattering assembly 200. FIG. 2B depicts a cross-sectional view of the scattering assembly 200 through the line II-II depicted in FIG. 2A. In embodiments, the scattering assembly 200 may be used in place of the scattering assembly 106 described herein with respect to FIG. 1.

As depicted in FIG. 2A, the scattering assembly 200 includes a reservoir 202 and at least one field source 206. In embodiments, the reservoir 202 (or a portion thereof) is constructed of a material that is substantially transparent (e.g., greater than 90% transmission) to light being used for imaging (e.g., the object light 103 and the point illumination light 112 described with respect to FIG. 1). The reservoir 202 is depicted to be substantially parallelepiped-shaped, though other geometries may be used consistent with the present disclosure. The at least one field source 206 generates an electromagnetic field that is applied to the reservoir 202 to manipulate a scattering medium configuration of the scattering assembly 200.

As depicted in FIG. 2B, the reservoir 202 defines a cavity 208. The cavity 208 is filled with a combination of a suspension medium 212 and a scattering medium 214. The scattering medium 214 includes a plurality of particles 216 that are suspended in the suspension medium 212. The suspension medium 212 may include any suitable fluid. In embodiments, selection of a particular fluid for the suspension medium 212 may depend on properties of the particles 216 (e.g., the material out of which the particles 216 are constructed, the size of the particles 216) so that the fluid prevents clumping of the particles 216 (e.g., due to electrostatic attraction between the particles). Suitable fluids for the suspension medium 212 include, but are not limited to water, ethanol, ethylene glycol. In embodiments, additives other than the particles 216 are added to the suspension medium 212 for additional effects. For example, in embodiments, a laser dye may be added to add gain to the scattering medium 214. In embodiments, an ion source (e.g., salt compounds) may be added to the suspension medium 212 to facilitate the utilization of a particular force for self-assembly of the plurality of particles 216 into scattering elements. In an example, a salt is added to the suspension medium 212 such that a negative dielectrophoresis (DEP) force is exerted on plastic-based particles via a varying electromagnetic field from the at least one field source 206. Additives such as salt may be added to tune the polarizability of the suspension medium 212 relative to the particles 216 in order to control a response of the particles 216 in response to the electromagnetic field from the at least one field source 206. Polarizability may also tuned via selection of the material out of which the particles 216 are constructed of.

The utilization of the plurality of particles 216 suspended in the suspension medium 212 beneficially facilitates rapid re-configurability of the scattering medium configuration of the scattering medium 214 between collecting different object-point source response pairs. The size of the plurality of particles 216 may be selected based on available field strength from the at least one field source 206 such that the arrangement of the plurality of particles 216 is adjustable by tuning the at least one field source 206. As will be appreciated, particles suspended in a liquid medium (such as the suspension medium 212) may move randomly due to Brownian motion. If left uninfluenced, the plurality of particles 216 may yield random optical responses dependent on their intrinsic order. However, if the plurality of particles 216 are selected so as to be manipulated by an electromagnetic field from the at least one field source 206, the plurality of particles 216 may be arranged to provide a favorable optical response.

In embodiments, to enable the at least one field source 206 to manipulate the plurality of particles 216 in a manner that results in effective imaging using the methods described herein, the plurality of particles 216 may have optimal sizes such that the electromagnetic field overcomes Brownian motion of the plurality of particles 216, but can also provide sufficient scattering-cross section for image differentiation. Accordingly, in various embodiments, the plurality of particles 216 include a largest dimension, which may vary depending on the shape of the plurality of particles (e.g., a diameter, a length, a width, etc.) that is greater than or equal to 10 nm and less than or equal to 10 µm.

When the plurality of particles 216 meet such size constraints, they can beneficially be dynamically reconfigured in the suspension medium 212 by changing the configuration of the at least one field source 206 to elicit self-assembly of groupings of the plurality of particles 216 into scattering elements that alter a propagation direction of light traveling through the scattering assembly 200. The overall configuration of the plurality of particles 216 may be governed by particle polarization within the electromagnetic field supplied by the at least one field source 206. In embodiments, the electromagnetic field produces an induced dipole on each particle 216 resulting in each particle 216 orienting and/or migrating within the cavity 208 to a net potential energy minimum along field lines. As such, the direction in which each of the plurality of particles 216 migrates or orients may be tuned by adjusting an orientation of the electromagnetic field (e.g., by adjusting the relative orientation of the at least one field source 206 and the reservoir 202, by activating different portions of the at least one field source 206, and the like). Alternatively or additionally, the manner in which the plurality of particles 216 orient or migrate may also be tuned by altering the magnitude of the electromagnetic field or the field frequency. The scattering assembly 200 depicted in FIGS. 2A and 2B is beneficial in that particles that are used as the plurality of particles 216 disposed in the cavity 208 may be selected based on the particular imaging application. That is, the plurality of particles 216 may be functionalized depending on the particular application (e.g., depending on the particular size of the object 102, whether polarization-based imaging is used, the particular wavelength of light being used for imaging, etc.).

The at least one field source 206 may take a variety of forms depending on the implementation. For example, in the example shown in FIG. 2B, the at least one field source 206 includes a first electrode 209 and a second electrode 210 disposed on opposing sides of the cavity 208. The at least one field source 206 also includes a power source 230 for supplying a voltage differential between the first electrode 209 and the second electrode 210 to generate an electric field. Application of an alternating current (AC) voltage differential across the first electrode 209 and the second electrode 210 via the power source 230 may form a time-varying electric field extending between the electrodes 209 and 210 through the cavity 208. Such a time-varying electric field may induce a dipole condition on each of the plurality of particles 216 and cause each of the dipoles to orient and/or migrate along the electric field (e.g., in the X-direction). In embodiments, each of the plurality of particles 216 disposed proximate to one of the first and second electrodes 209 and 210 may be subjected to a force, causing alignment of those particles in the direction of the applied field. Towards the center of the cavity 208, away from the first and second electrodes 209 and 210, polarization-induced dipoles of the nanowires may cause chaining of the plurality of particles 216. DEP forces on the peripheral particles disposed proximate to the first and second electrodes 209 and 210 may then cause linking of the dipole-induced chains to cause a field-induced linkage of a plurality of groupings of the plurality of particles 216 into scattering elements extending substantially the entirety of the distance between the first and second electrodes 209 and 210 across the cavity 208. Such self-assembly of the plurality of particles 216 beneficially provides scattering elements to create sufficient imaging differentiation over the case where Brownian motion of the plurality of particles 216 governs their positioning.

In embodiments, the first electrode 209 and the second electrode 210 are disposed within the cavity 208. In embodiments, the first electrode and the second electrode 210 are disposed relative to the reservoir 202 such that light being used to generate images (e.g., the object light 103 and the point illumination light 112 described herein with respect to FIG. 1) is not incident thereon. Such embodiments may be beneficial in that the electric field orients the plurality of particles 216 in a direction perpendicular to the light propagation direction (e.g., the Z-direction) to create a relatively large scattering cross-sections. In embodiments, the first electrode 209 and the second electrode 210 are transparent to the light being used for imaging and may be placed along the propagation path. In embodiments, the first electrode 209 and the second electrode 210 are not in contact with the reservoir. For example, the first electrode and the second electrode 210 may be held in spaced relation to the reservoir 202 such that the relative orientation between the generated electric field relative to the reservoir 202 may be adjusted without moving the reservoir 202 and causing motion of the plurality of particles 216. Additional embodiments may include different numbers and arrangements of electrodes or arrays of electrodes. For example, in embodiments, the at least one field source 206 comprises two arrays of electrodes opposing one another. The electrodes may be controlled individually or in combination to generate a plurality of different patterns of fields extending through the extension medium 212. Such an arrangement beneficially provides flexibility to generate a plurality of scattering medium configurations in succession during imaging.

While the example described with respect to FIGS. 2A and 2B utilizes an electric field to control the plurality of particles 216, it should be understood that alternative mechanisms are contemplated and within the scope of the present disclosure. For example, in embodiments, rather than include the first and second electrodes 209 and 210, the at least one field source 206 may include a magnetic field source such as a coil surrounding the reservoir 202 or wire positioned proximate to the reservoir 202. Moreover, in embodiments, the at least one field source 206 includes a plurality of field sources, with at least two of the plurality of field sources generating electromagnetic fields. For example, as shown with respect to FIG. 2B, the first and second electrodes 209 and 210 both extend in the X-Z plane on opposing external surfaces of the reservoir 202. Embodiments may include two additional electrodes extending in the X-Z plane on additional opposing surfaces of the reservoir 202, and the light used for imaging may propagate through the surfaces of the reservoir not covered by the electrodes (e.g., the surfaces extending in the X-Y plane). Such additional electrodes may be coupled to the power source 230 and generate a time-varying electric field in the Y-direction to cause orientation of the plurality of particles 216 in the Y-direction. As described herein, such an arrangement may be used to sequentially orient the plurality of particles 216 in different directions to produce different image-point illumination response pairs for the multi-shot methods described herein. Any number of electrodes producing an electric field in any orientation relative to the light propagation direction may be used consistent with the present disclosure.

In the embodiment depicted in FIGS. 2A and 2B, the cavity 208 has a width (e.g., in the X-direction) that is larger than the length of the plurality of particles 216. Such a design facilitates self-assembly of the plurality of particles 216. It should be understood that the present disclosure is not limited to embodiments including self-assembly of the plurality of particles 216. For example, in embodiments, the reservoir 202 has a width in the X-direction that is comparable to a length of the plurality of particles 216, such that the nanoparticles rotate to align with the field extending between the first and second electrodes 209 and 210 as single units. Additionally, the scattering assembly 200 may include transparent electrodes through which the object light 103 and point illumination light 112 propagate during imaging. Such an arrangement may facilitate control of the plurality of particles during imaging.

Figure 2C:
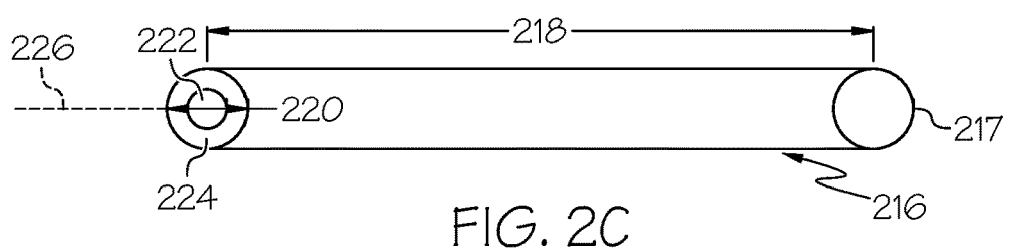
FIG. 2C schematically depicts a nanowire of the scattering assembly depicted in FIG. 2A, according to one or more embodiments described herein.

Referring now to FIG. 2C, one of the plurality of particles 216 is shown, according to an example embodiment. The particle 216 is a substantially cylindrical-shaped nanowire 217. A wire axis 226 extends through a center of the nanowire 217. The nanowire 217 has a length 218 in the direction of the wire axis 226 and a diameter 220. As described herein, the length 218 and the diameter 220 may be chosen based on the implementation, depending on the available electromagnetic field strength from the at least one field source 206. Generally, when a relatively large magnitude field is available, larger nanowires may be used than in cases when only relatively small fields are available. In an example, the length 218 is approximately 4.5 μm (e.g., equal to 4.5 μm), while the diameter 220 is approximately 300 nm (e.g., equal to 300 nm). In embodiments, the diameter 220 is greater than or equal to 10 nm to facilitate the field from the at least one field source 206 controlling the nanowire 217. The nanowire 217 may be further characterized by defining an aspect ratio A that is a measure of the length 218 divided by the diameter 220. In embodiments, the aspect ratio A of the nanowire 217 is greater than or equal to 5.0 and less than or equal to 200.0. In embodiments, (e.g., where carbon nanotubes are used for the plurality of particles 216) the aspect ratio A is greater than or equal 1000 (e.g., greater than or equal to 5000, greater than or equal 10,000). In embodiments, the plurality of particles 216 are of a different shape than the nanowire 217 and do not possess the aspect ratio A.

The nanowire 217 may be constructed from a plurality of different materials depending on the implementation. In the depicted embodiment, the nanowire 217 comprises a core 222 and a coating layer 224. The core 222 may be a metallic material. The core 222 may be constructed of a material possessing relatively high conductivity to facilitate responsiveness to the field generated by the at least one field source 206 In embodiments, the core 222 is metallic and constructed of one of Au, Pt, Ni, or other suitable metal. In embodiments, the core 222 is constructed of a semiconductor-based material. In embodiments, the coating layer 224 is an insulating material that beneficially reduces intermolecular forces between the nanowire 217 and other ones of the plurality of particles 216 to prevent unwanted agglomeration or clumping of the plurality of particles 216. In embodiments, the coating layer 224 is constructed of silica. The general construction of the core 222 may depend on the type of field produced by the at least one field source 206, the suspension medium 212 in which the plurality of particles 216 are suspended, and the size of the cavity 208.

The utilization of the nanowire 217 depicted in FIG. 2C for each of the plurality of particles 216 in the scattering assembly 200 is beneficial in that such a structure provides the capability of embedding novel material properties into the imaging system 100 (see FIG. 1). For example, in embodiments, the aspect ratio A of the nanowire may be used to induce polarization-dependent scattering to facilitate polarization-based imaging. In embodiments, when the object light 103 and the point illumination light 112 is polarized parallel to the wire axis 226, it was found that a plasmonic resonance may be induced in the plurality of particles 216 if the illumination light possesses the requisite wavelength. The plurality of particles 216 may be treated as dipole resonators, producing both forward and backward scattering waves. As such, if the illumination light is polarized perpendicular to the wire axis 226, the nanowire 217 acts as a scatterer with a small scattering cross-section without any plasmonic enhancement. When the illumination light is polarized parallel to the wire axis 226, plasmonic enhancement was observed, producing a significantly higher scattering-cross section. Thus, the utilization of the nanowire 217 depicted in FIG. 2C as the plurality of particles 216 facilitates the creation of a polarization-dependent PSF. That is, the scattering medium configuration of the scattering assembly 200 may be changed without adjusting the field from the at least one field source 206, but by virtue of its sensitivity to the polarization of the illumination light.

While the discussion herein details embodiments where the plurality of particles 216 are uniform in size and shape, it should be appreciated that alternative embodiments are contemplated and within the scope of the present disclosure. For example, in embodiments, the plurality of particles 216 are all the structure of the nanowire 217 described with respect to FIG. 2C, but have differing lengths 218. Given that the plasmonic resonance wavelength is dependent on the length, such an embodiment may be used to encode spectral information of the object 102 and provide for multi-spectral or hyper-spectral imaging. In embodiments, the plurality of particles 216 includes particles having different shapes. For example, in embodiments, the plurality of particles 216 includes a first plurality of particles that are shaped similar to the nanowire 217 described herein with respect to FIG. 2C, and a second plurality of particles having a different shape. The second plurality of particles may be spherical particles having a diameter greater than that of the nanowires. In embodiments, such spherical nanowires are constructed entirely of an insulating material such as silica. The spherical particles may cluster around the nanowires (e.g., due the DEP force resulting from the applied field) to increase scattering size. Any number of particles having any combination of shapes may be used consistent with the present disclosure. Moreover, in embodiments, the scattering medium 214 does not include particles and the at least one field source 206 induces different imaging responses within the suspension medium 212 (e.g., via manipulation of liquid phases or gas pockets within the suspension medium 212).

Figure 3:
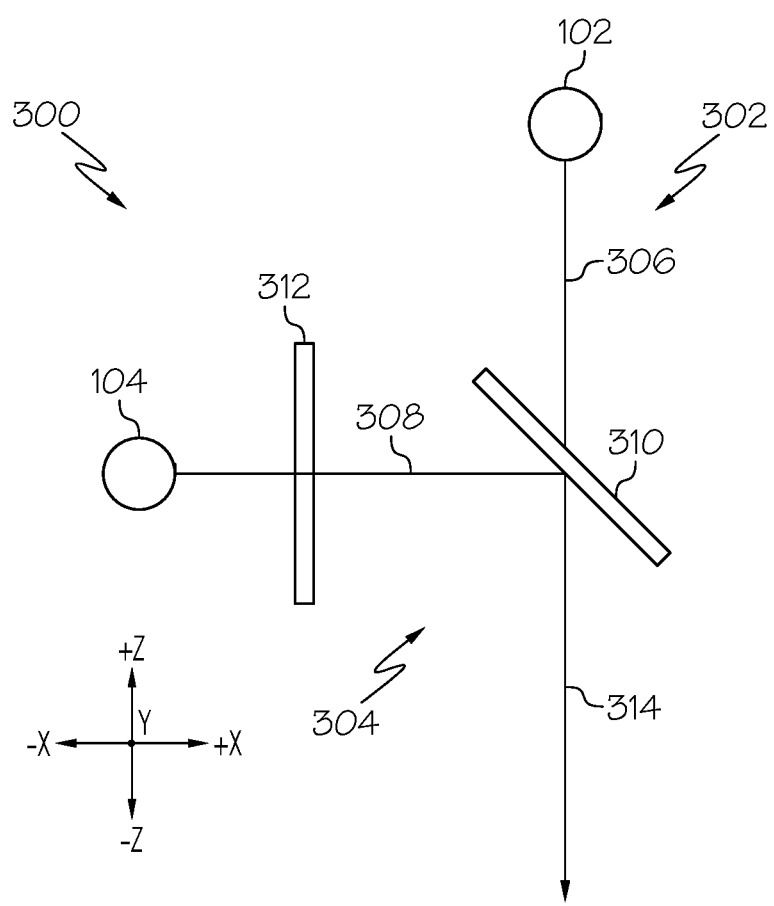
FIG. 3 schematically depicts an illumination optical system for providing imaging light to a scattering assembly of an imaging system, according to one or more embodiments described herein.

Referring now to FIG. 3, an illumination optical system 300 is schematically depicted. In embodiments, the illumination optical system 300 may be used to co-locate radiation originating from the object 102 and the point illumination source 104 of the imaging system 100 described with respect to FIG. 1. For example, in the embodiment described with respect to FIG. 1, the object 102 and the point illumination source 104 were placed side-by-side in the X-Y plane within the field of view the detector 108. Such an arrangement is operational given the shift invariant nature of the imaging system 100.

The illumination optical system 300 generally emits illumination light 314 towards downstream elements of the imaging system (e.g., the scattering assembly 106 and the detector 108). The illumination light 314 may be derived from either object light 306 originating from the object 102 or point illumination light 308 originating from the point illumination source 104, depending on the configuration of the illumination optical system 300. As depicted, the illumination optical system 300 includes an object subsystem 302 and a point illumination subsystem 304 combined by a beam splitter 310. In embodiments, the beam splitter 310 is a polarizing beam splitter that reflects light having a particular polarization and transmits light having polarizations that deviate from the particular deviation. In embodiments, the beam splitter 310 is a non-polarizing beam splitter partially reflecting and transmitting light. In the depicted example, the object subsystem 302 is situated such that the object light 306 is transmitted through the beam splitter 310 as the illumination light 314. The point illumination subsystem 304 is situated such that the point illumination light 308 may be reflected by the beam splitter 310 as the illumination light 314 if the point illumination light 308 possesses the polarization reflected by the beam splitter 310. In embodiments, the point illumination source 104 emits linearly polarized light having the orientation that is reflected by the beam splitter 310. As such, to prevent the point illumination light 308 from being a component of the illumination light 314, the point illumination subsystem 304 includes an adjustable polarization rotator 312 (e.g., a prism rotator, a quarter wave plate, a half wave plate, or any other suitable optical component) that may alter the polarization of the point illumination light 308 so as to be transmitted through the beam splitter 310 and not directed towards the scattering assembly 106 and detector 108. In embodiments, a blocking element (e.g., a shuttering device or the like) is disposed along the optical axis of the object subsystem 302 to block the object light 306 when the point illumination light 308 is directed towards the detector 108 via the beam splitter 310 or block the point illumination light 308 when the object light 306 is directed towards the detector 108 via the beam splitter 310.

Such an arrangement beneficially facilitates the object light 306 and point illumination light 308 originating from the same point within the field of view of the detector 108 and potential issues resulting from lateral offsets. The illumination optical system 300 also beneficially eliminates the need to move either the object 102 or the point illumination source 104 during imaging. It should be appreciated that the depicted illumination optical system 300 is exemplary only and not intended to be limiting. Various alternative arrangements are contemplated and within the scope of the present disclosure. For example, in embodiments, the position of the object 102 and the point illumination source 104 may be switched such that light originating from the object 102 is reflected off the beam splitter 310 towards the scattering assembly 106. Alternatively or additionally, embodiments are envisioned where both the object subsystem 302 and the point illumination subsystem 304 incorporate an adjustable polarization rotator. As will be appreciated, the particular configuration of the illumination optical system 300 may vary depending on the nature of the point illumination source 104 and the light originating from the object 102 (e.g., polarizations and wavelengths thereof). Additionally, embodiments are also envisioned where the illumination optical system 300 utilizes wavelength-based components rather than (or in addition to) polarization-based components.

Figure 4:
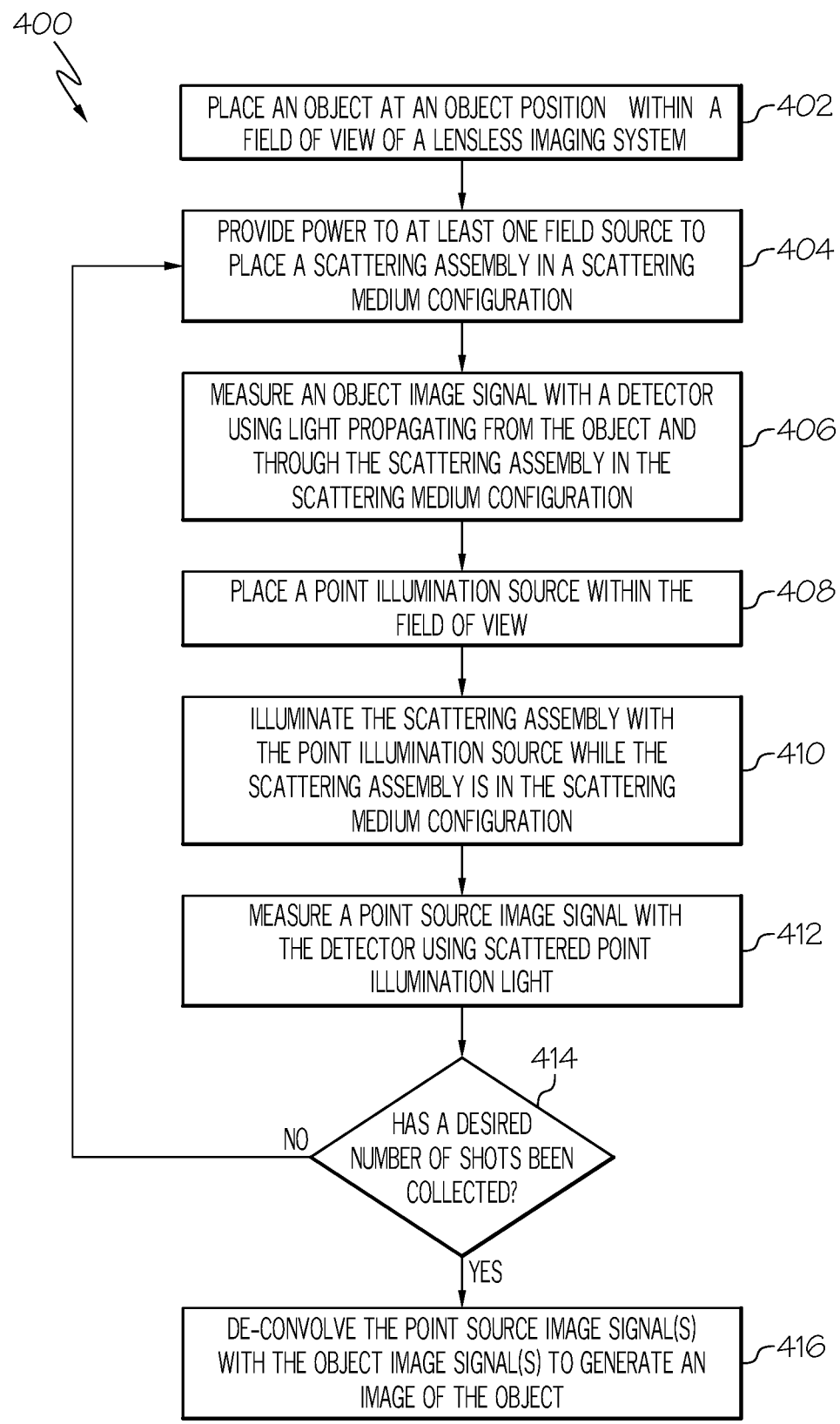
FIG. 4 depicts a flow diagram of a method of generating an image of an object using an imaging system, according to one or more embodiments described herein.

Referring now to FIG. 4, a flow diagram of a method 400 of generating an image of an object using a imaging system is shown, according to an example embodiment. In embodiments, the method 400 is performed via the imaging system 100 described herein with respect to FIG. 1, modified to incorporate the scattering assembly 200 described herein with respect to FIGS. 2A, 2B, and 2C in place of the scattering assembly 106. Accordingly, like reference numerals may be used in the description of the method 400 to indicate the utilization of such components. It should be understood that the method 400 may be used with different imaging systems than those described herein.

In a step 402, the object 102 is placed within the FOV of the detector 108 of the imaging system 100. As described herein, the object 102 may be any object of interest. In embodiments, the object 102 is itself a light source and emits object light 103 therefrom. In embodiments, the object 102 is not a light source and light from an external source (e.g., from the ambient environment of the imaging system 100, from an external light source, or the like) may scatter or reflect off the object 102 towards the detector 108. In a step 404, power is provided to the at least one field source 206 of the scattering assembly 200 to place a scattering medium 214 of the scattering assembly 200 into a scattering medium configuration. In embodiments, the image processing system 114 (or other control system) is communicably coupled to the power source 230 or the at least one field source 206 such that power is provided to the at least one field source 206 to generate an electromagnetic field.

As described herein, the scattering medium 214 of the scattering assembly 200 may be selected based on the electromagnetic field generated by the at least one field source 206 such that the scattering medium 214 is manipulated by the electromagnetic field produced by the at least one field source 206. The scattering medium 214 may include a plurality of particles 216, and the magnitude and frequency of the electromagnetic field may be selected such that the plurality of particles 216 migrate or orient themselves within the suspension medium 212 of the scattering assembly 200 in response to the electromagnetic field. In embodiments, the plurality of particles 216 includes a plurality of nanowires 217 of the structure described herein with respect to FIG. 2C, and may self-assemble into a plurality of scattering elements or chains from the DEP force generated by the electromagnetic field. The plurality of scattering elements may be aligned such that the plurality of scattering elements form a first scattering configuration with at least a portion of the plurality of particles 216 being aligned with the electromagnetic field.

In a step 406, the detector 108 measures an object image signal using light propagating from the object 102 and through the scattering assembly 206 while the scattering assembly 200 includes the first scattering medium configuration. As described herein, the detector 108 may include a plurality of detector elements that integrate an intensity of the scattered object light incident thereon. The image processing system 114 may assign the measured intensities to an image location based on the location of each detector element within the detector 108 to generate the object image signal.

In a step 408, the point illumination source 104 is placed within the FOV of the detector 108. In embodiments, the object 102 is removed from the FOV and replaced with the point illumination source 104. In embodiments, both the object 102 and the point illumination source 104 are placed in the FOV and laterally displaced from one another (e.g., in the X-Y plane) such that neither the object 102 nor the point illumination source 104 are moved during imaging. In embodiments, the illumination optical system 300 may be used, and light originating therefrom is redirected (e.g., via the beam splitter 310 described herein with respect to FIG. 3) within the FOV. In a step 410, the point illumination source 104 illuminates the scattering assembly 200 with the point illumination light 112 while the scattering assembly 200 is in the first scattering medium configuration generated via application of the electromagnetic field during the step 404. That is, between the steps 408 and 410, the configuration of the at least one field source 206 of the scattering assembly 200 is maintained such that an object image signal-point source image signal pair may be generated for the first scattering medium configuration.

In a step 412, the detector measures the point source image signal using the point source illumination light 112 that is scattered with the scattering assembly 106 in the first scattering medium configuration. The signals generated by each detector element is then assembled by the image processing system 114 into the point source image signal. The step 414 is a decision block where the method 400 determines whether a desired number of shots (e.g., point source image signal-object image signal pairs) has been collected.

Depending on the imaging application, the imaging system 100 may employ a single shot method or a multi-shot method for reconstructing the object 102 from the object image signal. In embodiments, when a single shot method is employed, the method 400 may advance to the step 416 to generate an image of the object 102. As described herein, traditional numerical methods such as inversed Fourier transform (IFT) or Wiener filter may not be suitable in such single shot embodiments. Accordingly, in embodiments, the image processing system 114 employs a total variation ("TV") regularized $L_1$ function approach to de-convolve the object image signal m from the point source image signal h using the following relation:

$$\hat{f} = \text{argmin } \tfrac{1}{2}\|m - h*f\|_2^2 + \tau\|TV\|_1 \quad (6)$$

where $\hat{f}$ is the optimized solution, $\tau$ is a weighting factor between the $L_1$ and $L_2$ error, controlling which error weighs more, and f is an estimate of the object. By minimizing the cost function, one finds an $\hat{f}$ which can fulfill the convolution relationship between the m and h (minimizing the $L_2$ error), while its TV is also minimized (the $L_1$ term). In embodiments, a higher $\tau$ may result in a smoother image, but with less precise edges. In embodiments, the equation 6 does not produce an accurate result that reflects the object 102. For example, the solution $\hat{f}$ may be missing information about the object 102 due to measurement noise, scattering, and/or loss of a portion of the high-spatial-frequency components during the light propagation process.

Due to these deficiencies of the single shot reconstructive method, the imaging system 100 (e.g., via the image processing system 114) may employ a multi-shot technique for reconstructing an image of the object 102. By using multiple object image signal-point source image signal pairs, the multi-shot method may obtain additional information about the object 102 that may be lost due to diffraction, scattering and noise during the collection of object image signal-point source image signal pairs. To facilitate the provision of additional object information in each shot, the method 400 may update the scattering medium configuration of the scattering assembly 200 between the collection of each object image signal-point source image signal pair.

Accordingly, if it is determined that a desired number of shots of the object has not been collected during the step 414, the method may revert back to the step 404, and the configuration of the at least one field source 206 is altered to change the scattering medium configuration of the scattering assembly 106. In embodiments, the configuration of the at least one field source 206 is not altered between the generation of successive object image signal-point source image signal pairs (i.e., the scattering medium configuration of the scattering assembly 200 may remain constant between iterations of the method 200). In embodiments, the at least one field source 206 is manipulated to alter an orientation of the electromagnetic field to change the orientation of the scattering elements formed from the plurality of particles 216 relative to the light propagation direction. In embodiments, power (e.g., from the power source 230) may be supplied to a different portion of the at least one field source 206 to change the orientation. In an example, during the first iteration of the method 400, a voltage differential may be applied between the first and second electrodes 209 and 210 to create an electric field in the X-direction and cause scattering elements to align in the X-direction. During the second iteration of the method 400, a voltage differential may be applied to another pair of electrodes (not depicted) to create an electric field in the Y-direction. Alternatively, the same pair of electrodes may be used, but the rotational orientation of the reservoir 202 and the pair of electrodes 209 and 210 may be adjusted to adjust the orientation of the electrical field. In embodiments, rather than the orientation of the electromagnetic field, the magnitude and/or the frequency of the electromagnetic field is updated between iterations of the method 400. In embodiments, the polarization of the object light 103 and/or point source illumination light 112 is updated between iterations of the method 400. In embodiments, the wavelength of the object light 103 and/or point source illumination light 112 is updated. Any combination of parameters (e.g., illumination light adjustment, field orientation, field magnitude, field frequency, field type) may be used consistent with the present disclosure. Any update to the configuration of the imaging system 100 updating the scattering response of the scattering assembly 200 may be used to generate an object image signal-point source image signal pair.

Any number of shots may be collected, consistent with the present disclosure to achieve a desired signal-to-noise ratio or resolution. In embodiments, the method 400 performs the step 416 after each iteration, and the resulting image is analyzed (e.g., for signal-to-noise ratio) and compared to a threshold to determine if further iterations are needed. Once a desired number of shots are collected in multi-shot embodiments, the method 400 may be used to reconstruct the image of the object 102 from object image signal with the point source image signal via a multi-shot method.

In embodiments, the image processing system 114 employs a multi-shot alternating direction method of multipliers ("ADMM") algorithm for reconstruction. This approach may have the following governing equation for N measurements:

$$\hat{f} = \underset{w \geq 0,\, u,\, v}{\text{argmin}} \ \frac{1}{2N} \sum_{i=1}^{N} \|m^i - v^i\|_2^2 + \tau\|u\|_1 + \mathbb{1}_+(w) \quad (7)$$

such that $$v^i = M^{(i)} f \quad (8)$$

$$u = \Psi f \quad (9)$$

$$w = f \quad (10)$$

Where $m^i$ is the measured scattering pattern for the $i^{th}$ shot, f is the object to be reconstructed, $\hat{f}$ is the optimized result, M is the convolution operator, $\Psi$ is the gradient operator, and $\mathbb{1}_+$ is the non-negative barrier function. The variables v, u, and w provide the constraints for convolution, sparsity, and non-negativity, respectively. In embodiments, equation 7 is solved using a plurality of penalty parameters and dual variables set in accordance with the method described with respect to FIG. 5.

Figure 5:
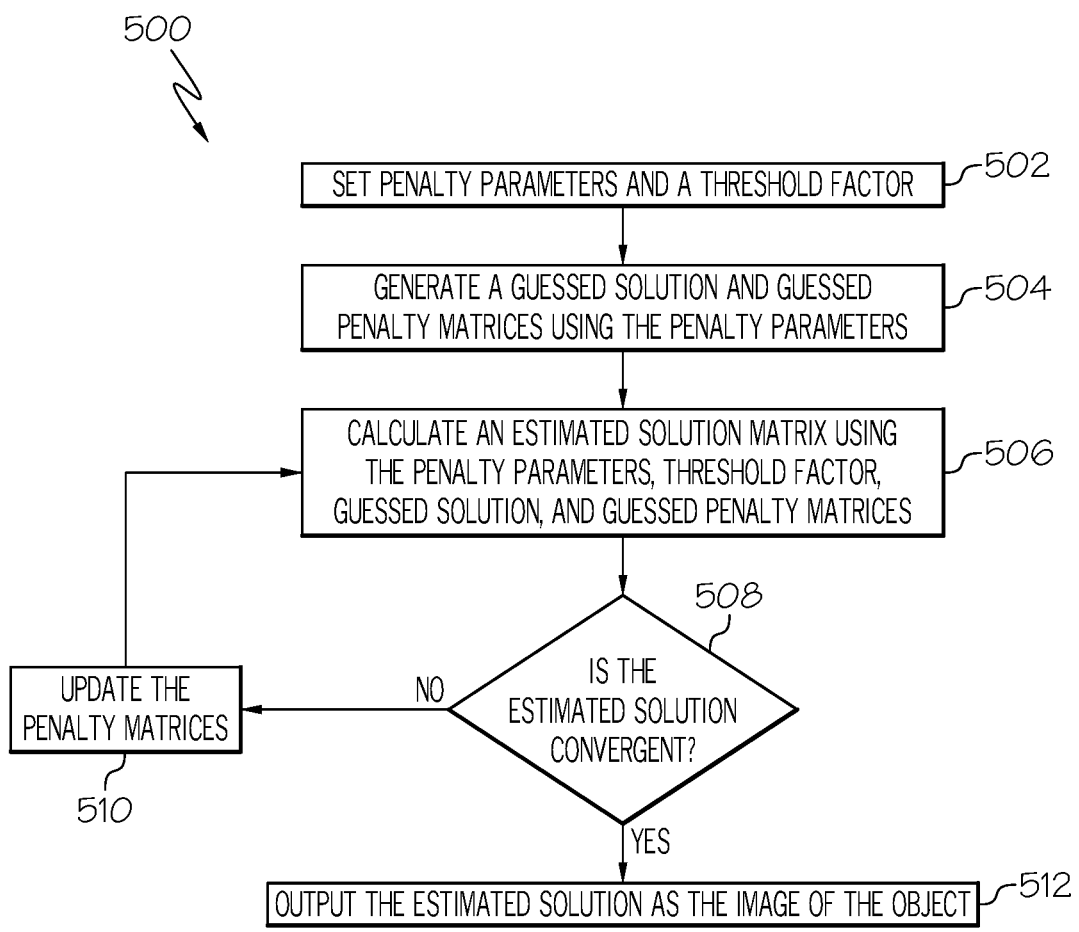
FIG. 5 depicts a flow diagram of a method of generating an image of an object with at least two object image signal-point source image signal pairs using a multi-shot method, according to one or more embodiments described herein.

Referring now to FIG. 5, a flow diagram of a method 500 of outputting an object image using multiple object image signal and point source image pairs is depicted, according to an example embodiment. The method 500 may be performed by the image processing system 114 described herein with respect to FIG. 1 in the performance of an ADMM algorithm for reconstructing the image of the object from an object image signal paired with a point source image signal using a multi-shot method in solving equation 7 herein. In embodiments, the image processing system 114 employs a recursive framework for estimating an object image by defining a plurality of parameters $\mu_{1,2,3}$, dual variables $\rho$, $\xi$, and $\eta$ (that determine the updating procedure for the solution in the $k^{th}$ iteration), a threshold $\tau$ and the optimization variables u, v, and w in accordance with the following framework $$u_{k+1} \leftarrow \begin{cases} \Psi f_k + \frac{\eta_k}{\mu_2} & \text{if } \tau = 0 \\ T_{\frac{\tau}{\mu_2}}\left(\Psi f_k + \frac{\eta_k}{\mu_2}\right) & \text{if } \tau \neq 0 \end{cases} \quad (11)$$

$$v_{k+1}^{(i)} \leftarrow \left(\frac{1}{N}I + \mu_1^{(i)}I\right)^{-1}\left(\frac{1}{N}m^{(i)} + \mu_1^{(i)}M^{(i)}f_k + \xi_k^{(i)}\right) \quad (12)$$

$$w_{k+1} \leftarrow \max\left(f_k + \frac{\rho_k}{\mu_3}, 0\right) \quad (13)$$

$$f_{k+1} = \left\{\left[\sum_{i=1}^{n} \mu_1^{(i)}(M^{(i)})^T M^{(i)}\right] + \mu_2 \Psi^T \Psi + \mu_3\right\}^{-1} \quad (14)$$
$$\left\{\left[\sum_{i=1}^{n}(M^{(i)})^T(\mu_1^{(i)}v_k^{(i)} - \xi_k^{(i)})\right] + \Psi^T(\mu_2 u_k - \eta_k) + \mu_3 w_k - \rho_k\right\}$$

$$\xi_{k+1}^{(i)} \leftarrow \xi_k^{(i)} + \mu_1^{(i)}(M^{(i)}f_k - v_k^{(i)}) \quad (15)$$

$$\eta_{k+1} \leftarrow \eta_k + \mu_2(\Psi f_k - u_k) \quad (16)$$

$$\rho_{k+1} \leftarrow \rho_k + \mu_3(f_k - w_k) \quad (17)$$

where I is an identify matrix, and T is the soft threshold function, defined by $$T_a(x) = \begin{cases} x - a & \text{if } x > a \\ 0 & \text{if } |x| \leq a \\ x + a & \text{if } x < -a \end{cases} \quad (18)$$

In accordance with this framework, in a step 502, the parameters $\mu_{1,2,3}$ and the threshold factor c are set to predetermined values. In an example, ($\mu_1$=0.005, $\mu_2$=0.05, $\mu_3$=0.005, and c=$10^{-4}$). In embodiments, such values are input by a user of the image processing system 114. In embodiments, such values are stored in the memory of the image processing system 114. In a step 504, the image processing system 114 generates a solution matrix $f_k$ and matrices $\rho$, $\xi$, and $\eta$. In embodiments, for the initial iteration, the matrices are set as zero matrices having a size of the solution. In a step 506, the image processing system 114 calculates an estimated solution using the parameters and threshold factor set in the step 502, the guessed solution matrix $f_k$, and the guessed matrices $\rho$, $\xi$, and $\eta$ generated in the step 504. The image processing system 114 may utilize equation 14 to compute the estimated solution. For example, the matrices $\rho$, $\xi$, and $\eta$ may be used to calculate u, v, and w variables via equations 11-13 herein, and the results may be input to the equation 14 to calculate an estimated solution $f_{k+1}$.

In a step 508 it is determined whether the estimated solution calculated in the step 506 is convergent. In embodiments, the step 508 occurs initially after a predetermined number of iterations of the preceding steps and determines if differences between subsequent solutions are approaching zero. If the solution is not convergent, the matrices $\rho$, $\xi$, and $\eta$ are updated using an optimization technique, the updated matrices $\rho$, $\xi$, and $\eta$ are used to calculate updated u, v, and w variables to compute an additional solution $f_{k+1}$. Such a process continues until a convergent solution is reached.

Once a convergent solution is reached, the image processing system 114 outputs the estimated solution as an image of the object (e.g., as the output of the method 400). In embodiments, the image processing system 114 presents the object image on a display of the image processing system. In embodiments, the image processing system 114 may transmit the object image over a network. By incorporating information from a plurality N of object image signal-point source image signal pairs, the framework outlined in accordance with equations 11-18 herein provides relatively high resolution images of the object 102.

EXAMPLES

With reference to FIG. 1, in the examples described herein for the point illumination source 104, a broadband white light source (tungsten halogen light source, HL-2000-LL, Ocean Optics) was coupled into a single mode fiber (core size ~4.3 um, SM600), and an end of the fiber was positioned as the point illumination source 104 in FIG. 1. The structure of the scattering assembly 106 varies in the examples that follow.

FIGS. 6A and 6B each depict a first example scattering assembly 600, an optical microscopy images of an object 102, and a PSF (i.e., a point source image signal resulting from the point source 104) of the imaging system 100 incorporating the scattering assembly 600 as the scattering assembly 106. FIG. 6A depicts the scattering assembly 600 without a field present, a first object image 602, and a first PSF 604. FIG. 6B depicts the scattering assembly 600 with a field present, a second object image 606, and a second PSF 608. The scattering assembly 600 includes a first electrode 610 and a second electrode 612. The first and second electrodes 610 and 612 were constructed of indium tin oxide (ITO), which is transparent to the light used for imaging (e.g., the object light 103 and the point illumination light 112). In embodiments, the light used for imaging is initially incident on the first electrode 610 and the detector 108 was placed beneath the second electrode 612. The scattering assembly 600 includes spacers 614 extending between the first electrode 610 and the second electrode 612. In embodiments, the spacers 614 are approximately 500 μm thick in the light propagation direction. The spacers 614 are constructed of silicone. In embodiments, a hole may be formed in a volume of silicone-based material to form the reservoir for the suspension medium 616. The first and second electrodes 610 and 612 define a reservoir filled with a suspension medium 616 (e.g., water). A plurality of nanowires 618 are disposed in the suspension medium 616. The plurality of nanowires 618 in this example were 300 nm in diameter and 4.5 μms long and were constructed with Au core portions coated with $SiO_2$. In the example shown, 3.5 μL of nanowire solution (e.g., having a nanowire concentration of $1×10^9$ nanowires/mL) was placed between the first and second electrodes 610 and 612.

The nanowires 618 were produced as follows. Potassium aurocyanide solution is plated into alumina membranes; the membrane pore size and electrodeposition duration dictate the wire diameter and length, respectively. The released wires were coated with a thin layer of amorphous silica using a sol-gel method, and dispersed in deionized water. The particles were characterized using transmission electron microscopy (JEOL JEM 1200 EXII) at 80 keV using an ORIUS 830 SC200 CCD camera. Particle dimensions were determined to be 4.50±0.66 μm (length)×0.47±0.08 μm (diameter) using NIH ImageJ software. Particle solution concentration was determined using a Hausser Scientific Neubauer hemocytometer.

To connect the first and second electrodes 610 and 612 to the power source 230 (see FIG. 2) gold thread (from Ametek® Electric Components) and silver adhesive (from Electron Microscopy Sciences) were used. A function generator was used as the power source 230 for generation of the electric field. In embodiments, the first and second electrodes 610 and 612 are ITO glass coverslips (8-12Ω, SPI).

Particle assemblies were monitored using a Nikon TE300 inverted optical microscope with a halogen lamp for transmittance imaging. Field conditions were chosen by observing particle behavior using microscopy while varying the applied field conditions. In embodiments, preferred field conditions were considered those in which the nanowires 618 stood up upon field application. For optical measurements, broadband white light source (tungsten halogen light source, HL-2000-LL, Ocean Optics) was coupled into a single mode fiber (core size ~4.3 um, SM600) to serve as the point illumination source 104. A CMOS imaging sensor (UI-3592LE, IDS) was used as the detector 108. A thermoelectric temperature cooling plate (TECH3s, Thorlabs®) was placed under the CMOS imaging sensor to prevent thermal generation, which can cause heating of the scattering assembly 600 and subsequent boiling of the suspension medium 616. Image acquisition of every pair of object image signal and point source image signal took about 5 seconds (limited by the USB 3.0 data transfer time between the CMOS imager and the image processing system 114). The time interval between shots was 15 seconds to ensure that nanowires 618 were completely reconfigured. The computation time was around 25 seconds for single-shot reconstruction, and 250 seconds for 10-shot reconstruction (image size: 922×1228, CPU: Intel i9-9900k at 3.6 GHz, Memory: 32 GB, GPU: NVIDIA GeForce RTX 2080 Ti).

As depicted in FIG. 6A, without an electric field, the plurality of nanowires 618 accumulate at the bottom of the scattering assembly 600 due to their size and were randomly oriented due to Brownian motion. As depicted in FIG. 6B, application of an AC voltage to the first and second electrodes 610 and 612 resulted in an alignment of the plurality of nanowires with the electric field. Thus, in FIG. 6A, the scattering assembly 600 has a first scattering medium configuration and, in FIG. 6B, the scattering assembly 600 has a second scattering configuration. Several scattering patterns (e.g., object image signal-point source image signal pairs) were collected in each of the configurations depicted in FIGS. 6A and 6B and used to generate images of an object. FIG. 6C depicts a first object image 620 collected using a single shot method (e.g., a single object image signal-point source image signal pair) in accordance with equation 6 herein. FIG. 6D depicts a second object image 622 collected using a multi-shot method, using six object image signal-point source image signal pairs to reconstruct the object image 622 (e.g., using the method 500 described herein with respect to FIG. 5). As depicted, the second object image 622 is more detailed than the first object image 620 as a result of the additional information provided in each shot.

Figure 7A:
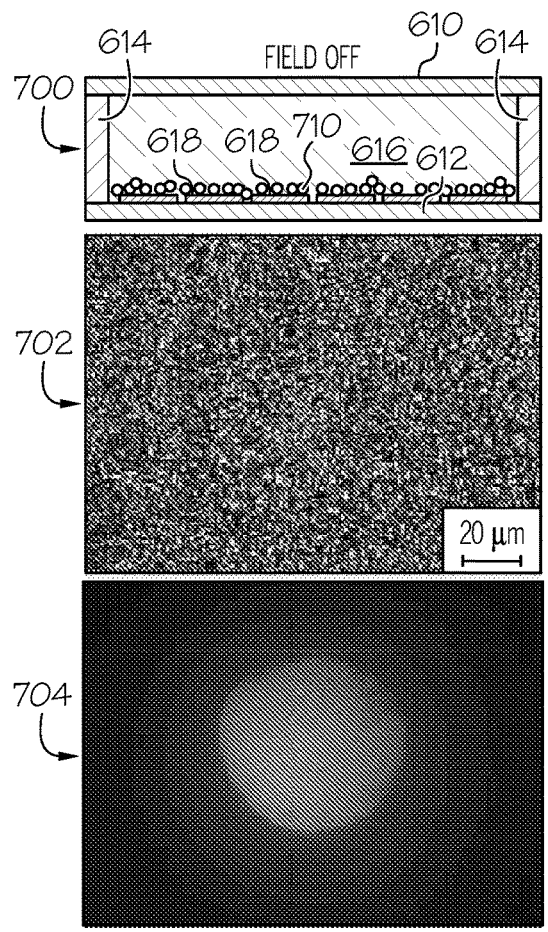
FIG. 7A depicts another example scattering assembly for an imaging system having a first scattering medium configuration, a first object image signal, and a first point source image signal, according to one or more embodiments described herein.
Figure 7B:
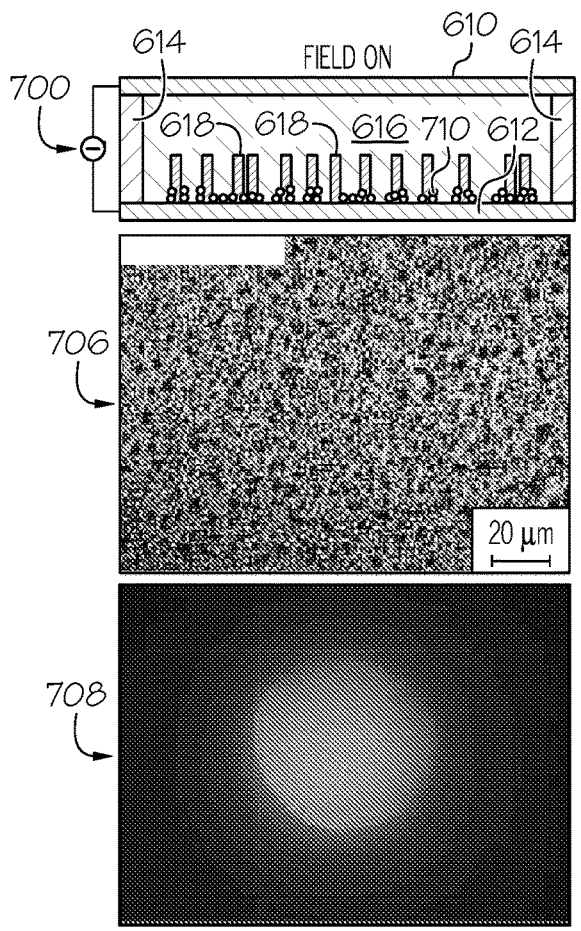
FIG. 7B depicts the scattering assembly shown in FIG. 7A having a second scattering medium configuration, a second object image signal, and a second point source image signal, according to one or more embodiments described herein.

FIGS. 7A and 7B each depict a second example scattering assembly 700, optical microscopy images of an object 102, and a PSF of the imaging system 100 incorporating the scattering assembly 700 as the scattering assembly 106. FIG. 7A depicts the scattering assembly 600 without a field present, a first object image 702, and a second PSF 704. FIG. 7B depicts the scattering assembly 700 with a field present, a second object image 706, and a second PSF 708. The scattering assembly 700 is similar in construction to the scattering assembly 600 described herein with respect to FIGS. 6A and 6B. Accordingly, like reference numerals are used in FIGS. 7A and 7B to indicate the incorporation of like components. In addition to the plurality of nanowires 618 described herein with respect to FIGS. 6A and 6B, the scattering assembly 700 includes a plurality of nanoparticles 710. The plurality of nanoparticles 710 were spheres having 2 μm diameters constructed of $SiO_2$. As depicted in FIG. 7B, the presence of the field causes the plurality of nanoparticles 710 to cluster around the plurality of nanowires 618 due to the DEP force, thus increasing the effective size of the scattering features.

Figure 7C:
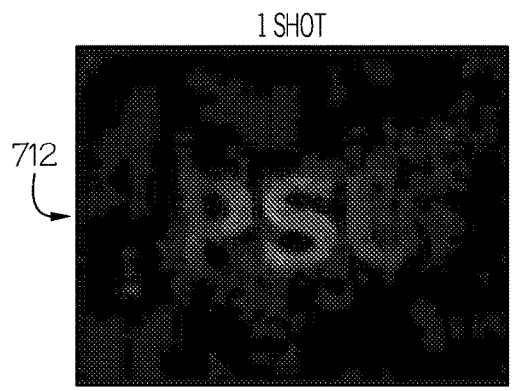
FIG. 7C depicts an image of an object generated via the scattering assembly depicted in FIGS. 7A and 7B constructed using a single shot method, according to one or more embodiments described herein.
Figure 7D:
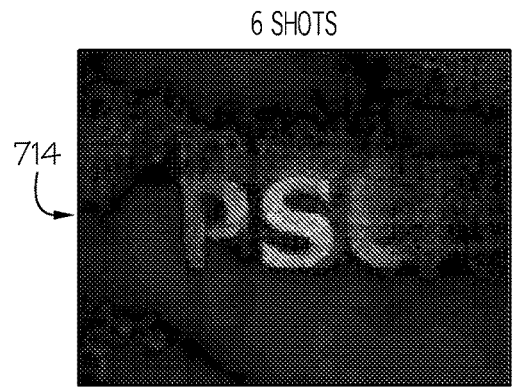
FIG. 7D depicts an image of an object generated via the scattering assembly depicted in FIGS. 7A and 7B constructed using a multi-shot method, according to one or more embodiments described herein.

Several scattering patterns (e.g., object image signal-point source image signal pairs) were collected in each of the configurations depicted in FIGS. 7A and 7B and used to generate images of an object. FIG. 7C depicts a first object image 712 collected using a single shot method (e.g., a single object image signal-point source image signal pair) in accordance with equation 6 herein. FIG. 7D depicts a second object image 714 collected using a multi-shot method, using six object image signal-point source image signal pairs to reconstruct the object image 714 (e.g., using the method 500 described herein with respect to FIG. 5). As depicted, the second object image 714 is more detailed than the first object image 712 as result of the additional information provided in each shot.

The examples described herein with respect to FIGS. 6A-7D demonstrate the efficacy of the systems and methods described herein for simple object reconstruction. However, these examples were not able to generate sufficient image quality for high resolution imaging. The inventors observed that the PSFs (e.g., depicted by reference numerals 604, 608, 704, and 708 in FIGS. 6A, 6B, 7A, and 7B, respectively) were similar irrespective of field configuration. Without wishing to be bound by theory, it is believed that such PSF consistency can be attributed to the orientation and size of the scattering elements (e.g., the nanowires 618). Because the nanowires 618 are oriented along the light propagation direction, the nanowires 618 have smaller cross-sections over cases when the nanowires 618 are oriented perpendicularly to the light propagation direction. Such small cross-sections generally result in low contrast PSFs, not effectively yielding additional object information with each shot.

FIGS. 8A, 8B, and 8C each depict another example scattering assembly 800, an optical microscopy image of an object 102, and a PSF of the imaging system 100 incorporating the scattering assembly 800 as the scattering assembly 106. FIG. 8A depicts the scattering assembly 800 without a field present, a first object image 818, and a first PSF 820. FIG. 8B depicts the scattering assembly 800 with a field present in a first orientation, a second object image 822, and a second PSF 824. FIG. 8C depicts the scattering assembly 800 with a field present in a second orientation, a third object image 826, and a third PSF 828. The scattering assembly 800 includes a reservoir 802 for a suspension medium 812 (e.g., water). The reservoir 802 is substantially parallelepiped-shaped, including three pairs of parallel surfaces that define a cavity in which the suspension medium 812 is disposed. In this example, the reservoir 802 has an internal volume to contain 3.5 µL of nanowire solution. The reservoir 802 includes silicon spacer material (e.g., 500 µm thick). Each surface of the reservoir 802 has an electrode disposed thereon. Accordingly, the scattering assembly 800 includes a first electrode 804, a second electrode 806, a third electrode 808, and a fourth electrode 810. The first, second, third, and fourth electrodes 804, 806, 808, and 810 extend through the suspension medium 812. The first and second electrodes 804 and 806 are a first electrode pair having a first orientation. The third and fourth electrodes 808 and 810 are a second electrode pair having a second orientation. In embodiments, each electrode in the first and second electrode pairs is separated from one another by 500 µm. The first, second, third, and fourth electrodes 804, 806, 808, and 810 are planar gold electrodes. The first, second, third, and fourth electrodes 804, 806, 808, and 810 were lithographically patterned onto No. 2 glass coverslips (35 mm diameter, GlycoTech). A bi-layer of photoresist (PMGI-SF6 and SPR-3012, MicroChem®) was spin-coated onto the coverslips, and exposed using Karl Suss MABA6 contact print lithography. The coverslips were developed in MF-CD-26 developer (2.4% tetramethylammonium hydroxide solution, MicroChem), exposed with an OAI Deep UV Flood tool, and developed in 101A developer (<5% tetraethylammonium hydroxide solution, MicroChem). Next, 15 nm Ti and 30 nm Au were evaporated onto coverslips using a Kurt Lesker Lab-18 electron beam evaporator, and lift-off was executed using Nano-Remover PG (MicroChem®).

Gold thread and silver adhesive was used to connect each of the first and second pairs of electrodes to the power source 230. In the present example, the power source 230 includes a first function generator and a second function generator. That is, the first function generator was connected to the first electrode pair and the second function generator was connected to the second electrode pair (e.g., in the present example, the power source 230 includes two separate power sources or function generators supplying time-varying voltages to the electrodes). In this example, light used for imaging (e.g., the object light 103 and the point illumination light 112) is incident in the direction facing the page, such that the light is not directly incident on any of the electrodes.

A plurality of nanowires 814 are disposed in the suspension medium 812. The nanowires 814 were the same as the nanowires 618 described herein with respect to FIG. 6A. The plurality of nanowires 814 in this example were 300 nm in diameter and 4.5 µms long and were constructed with Au core portions coated with $SiO_2$. As depicted in FIG. 8A, the plurality of nanowires 814 are randomly distributed and oriented in the suspension medium 812 (e.g., due to Brownian motion). FIG. 8B depicts the scattering assembly 800 in another scattering medium configuration with a time-varying voltage being applied to the third and fourth electrodes 808 and 810 to generate an electric field in a first direction. As depicted in FIG. 8B, such an electric field causes groupings of the plurality of nanowires 814 to self-assemble into chains (i.e., scattering elements) substantially oriented in the direction of the field. FIG. 8C depicts the scattering assembly 800 in another scattering assembly configuration with a time-varying voltage being applied to the first and second electrodes 804 and 806 to generate an electric field in a second direction. As depicted in FIG. 8C, such an electric field causes groupings of the plurality of nanowires 814 to self-assemble into chains (i.e., scattering elements) substantially oriented in the direction of the field. As depicted in FIGS. 8B and 8C, the field in the first direction results in a PSF 824 that significantly differs from the third PSF 828 generated by the field in the second generation. Accordingly, the scattering assembly 800 generates substantial differentiation between images from adjusting the scattering medium configuration.

Several scattering patterns (e.g., object image signal-point source image signal pairs) were collected in each of the configurations depicted in FIGS. 8A, 8B, and 8C, and used to generate images of an object. FIG. 8D depicts a first object image 830 collected using a single shot method (e.g., a single object image signal-point source image signal pair) in accordance with equation 6 herein. FIG. 8E depicts a second object image 832 collected using a multi-shot method, using six object image signal-point source image signal pairs to reconstruct the object image 832 (e.g., using the method 500 described herein with respect to FIG. 5). As depicted, the second object image 832 is more detailed than the first object image 830 as result of the additional information provided in each shot. Additionally, both the object images 830 and 832 are substantially clearer than the object images generated by the scattering assemblies 600 and 700 described herein.

Without wishing to be bound by theory, it is believed that the superior performance of the scattering assembly 800 is attributable to the configuration of the plurality of nanowires 814. Since the fields generated by the first and second electrode pairs extend in directions perpendicular to the light propagation direction, the nanowires 814 are oriented with their long axes perpendicular to the light used for imaging, creating a larger scattering cross-section. Such a larger cross-section yields greater image differentiation between shots and higher resolution.

Figure 9A:
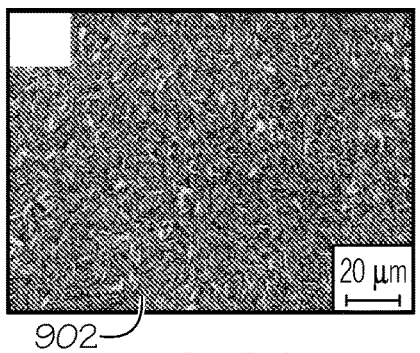
FIGS. 9A and 9B depict a series of overlaid object images and a color histogram representing an amount of overlapping positions of a plurality of particles of the scattering assembly depicted in FIGS. 8A, 8B, and 8C, according to one or more embodiments described herein.
Figure 9B:
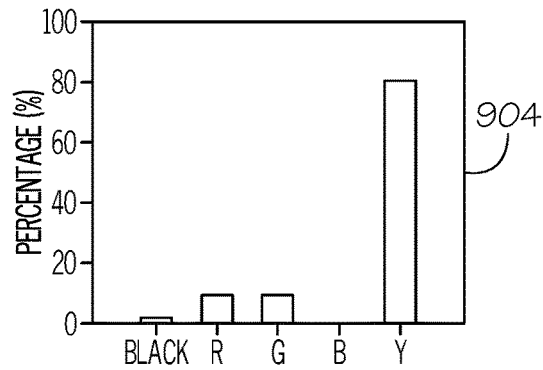
Figure 9C:
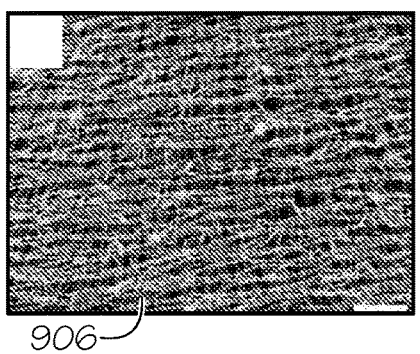
FIGS. 9C and 9D depict a series of overlaid object images and a color histogram representing an amount of overlapping positions of a plurality of particles of the scattering assembly depicted in FIGS. 8A, 8B, and 8C, according to one or more embodiments described herein.
Figure 9D:
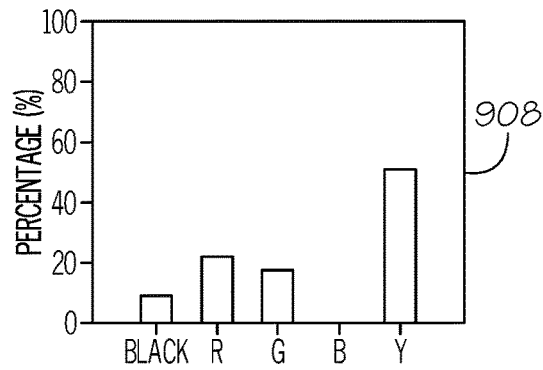
Figure 9E:
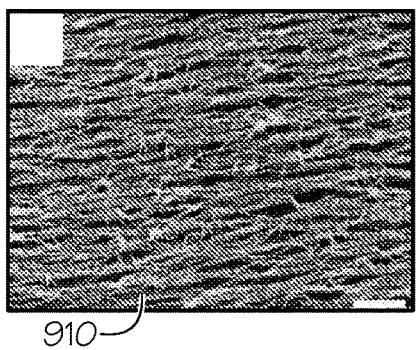
FIGS. 9E and 9F depict a series of overlaid object images and a color histogram representing an amount of overlapping positions of a plurality of particles of the scattering assembly depicted in FIGS. 8A, 8B, and 8C, according to one or more embodiments described herein.
Figure 9F:
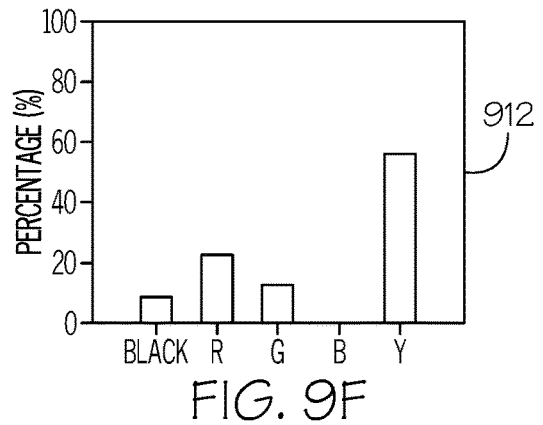
Figure 9G:
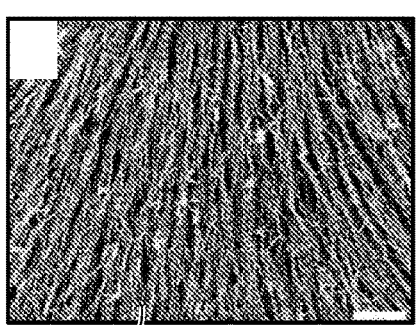
FIGS. 9G and 9H depict a series of overlaid object images and a color histogram representing an amount of overlapping positions of a plurality of particles of the scattering assembly depicted in FIGS. 8A, 8B, and 8C, according to one or more embodiments described herein.
Figure 9H:
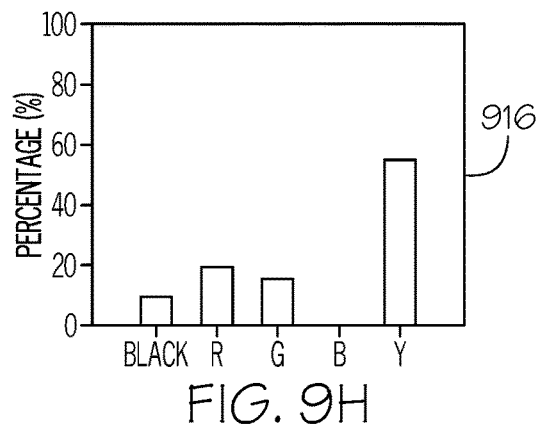

To quantify the image differentiation achieved via the scattering assembly 800, various pairs of object images collected with the scattering assembly 800 having different scattering medium configurations were generated, false colored (e.g., with black pixels representing background, and red, green, and yellow pixels representing wires overlapping between two overlaid images), and overlaid onto each other. FIG. 9A depicts a first set of overlaid object images 902 with no field present in the scattering image assembly 800 (e.g., leaving the nanowires 814 subject to Brownian motion) and FIG. 9B depicts a color histogram 904 of the first set of overlaid object images. The presence of 80% colored pixels indicates that the plurality of nanowires 814 did not move substantially between images. FIGS. 9C, 9E, and 9F depicts second, third, and fourth sets of overlaid object images 906, 910, and 914 with different fields present in the scattering assembly 800. For example, in FIG. 9C, the second set of overlaid object images 906 is generated by overlaying images taken with the electric field in different orientations. In FIG. 9E, the third set of overlaid object images 910 is generated by overlaying images taken with same orientation in both images (e.g., in the configuration shown in FIG. 8B). In FIG. 9G, the fourth set of overlaid object images 910 is generated by overlaying images taken with same orientation in both images (e.g., in the configuration shown in FIG. 8C). FIGS. 9D, 9F, and 9H depict second, third, and fourth color histograms 908, 912, and 916, which indicate that the yellow pixels are only about 50% of the overlaid sets of images depicted in FIGS. 9C, 9E, and 9G. Such a reduction in yellow pixels indicates that the electric fields used in the scattering assembly 800 significantly changes the arrangement of the nanowires 814, facilitating image differentiation for implementation of the multi-shot methods herein. Indeed, the first set of overlaid object images 902 exhibited a complex wavelet structural similarity (CW-SSIM) factor of approximately 0.6, while the second, third, and fourth sets of overlaid object images 906, 910, and 914 exhibited a CW-SSIM factor of approximately 0.36.

Figure 10A:
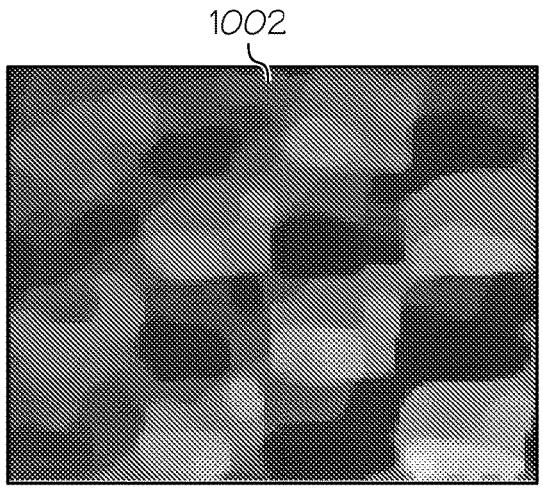
FIG. 10A depicts a first image of a checkerboard pattern generated via the scattering assembly depicted in FIGS. 8A, 8B, and 8C using a single shot method, according to one or more embodiments described herein.
Figure 10B:
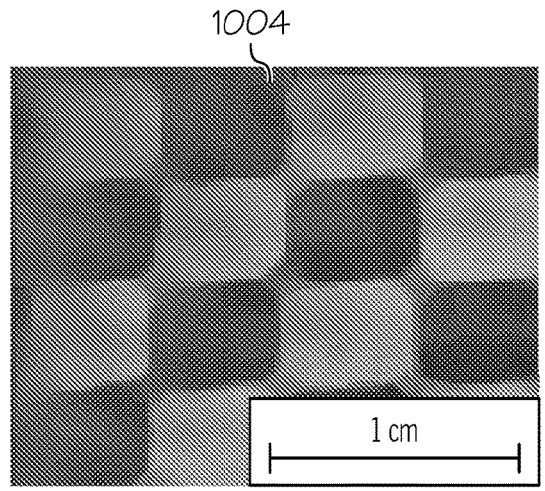
FIG. 10B depicts a second image of the checkerboard pattern generated via the scattering assembly depicted in FIGS. 8A, 8B, and 8C using a multi-shot method, according to one or more embodiments described herein.

To further quantify the performance of the imaging system 100 using the scattering assembly 800, a checkerboard pattern was imaged as the object 102. The checkerboard pattern was a 10×10 pattern, with each square having a length of 0.5 cm. The checkerboard pattern was imaged using both the single shot and multi-shot methods described herein. FIG. 10A depicts a first image 1002 of the checkerboard pattern constructed using the single shot method. FIG. 10B depicts a second image 1004 of the checkerboard pattern constructed using the multi-shot method. Each of the white squares on the checkerboard pattern may be thought of as a "1" region, while each of the black squares of the checkerboard pattern may be thought of as a "0" region. The signal-to-noise ratio ("SNR") of the images may be defined as $$SNR = \frac{\mu_1 - \mu_0}{\left(\sqrt{\sigma_1^2 + \sigma_0^2/2}\right)} \quad (19)$$

Where $\mu_{1,0}$ are the mean values of the "1" and "0" region, and $\sigma_{1,0}$ are the standard deviation values of the "1" and "0" regions on the checkerboard, respectively.

To compare the SNR values in different areas on a single image (e.g., either the first image 1002 or the second image 1004 depicted in FIGS. 10A and 10B), the images of the checkerboard pattern were segmented into 25 unit cells (2×2 per cell). The SNR according to equation 19 was then calculated for each cell. To avoid the ambiguity of defining zero or one in the edges, the edges of the squares were chopped with a window, and only pixels within the window were considered in the SNR calculations.

Figure 10C:
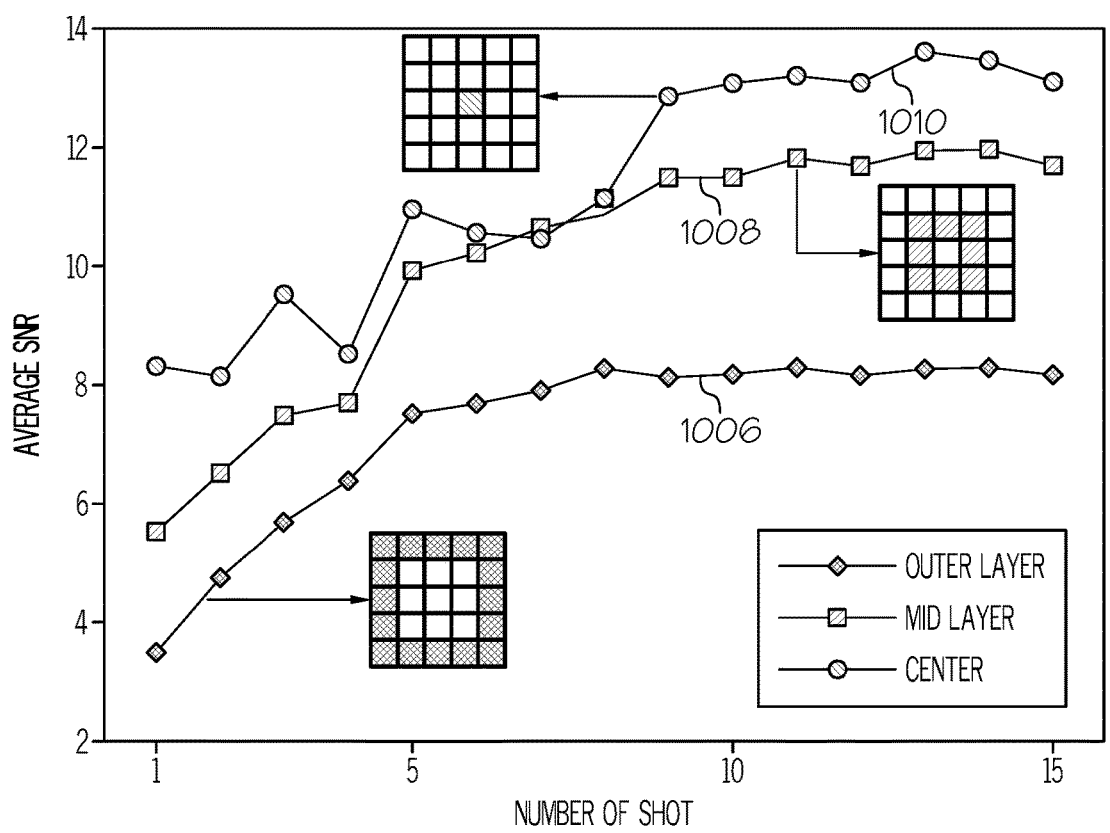
FIG. 10C depicts a chart depicting a signal-to-noise ratio of images of the checkerboard pattern as a function of number of shots using the scattering assembly depicted in FIGS. 8A, 8B, and 8C, according to one or more embodiments described herein.

FIG. 10C depicts a chart of the results of the SNR calculations as a function of number of shots. FIG. 10C includes a first curve 1010 depicting the calculated SNR as a function of number of shots for a central one of the 2×2 cells of the checkerboard pattern, a second curve 1006 depicting the calculated SNR as a function of number of shots for an outer grouping of the 2×2 cells, and a third curve 1008 depicting the calculated SNR as a function of number of shots for a middle grouping (e.g., disposed radially inward from the outer grouping) of the 2×2 cells. As shown, the SNR tends to be higher for the central cell, but for all of the cells, the SNR improves as a function of the number of shots.

Figure 11A:
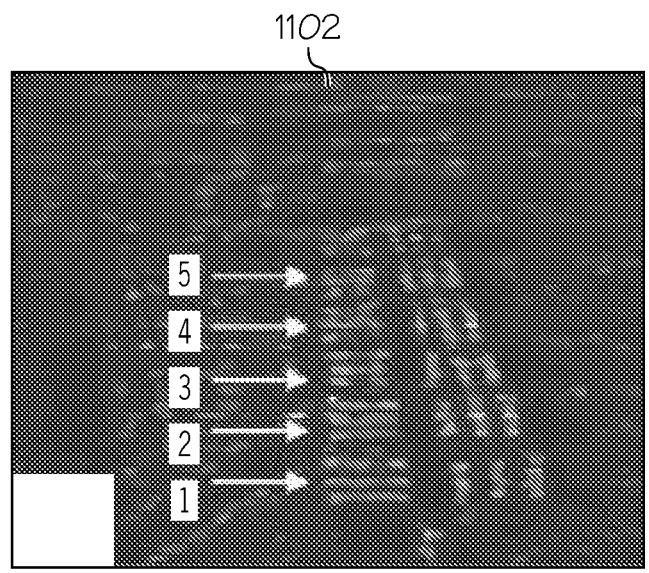
FIG. 11A depicts a first image of a resolution mask taken using the scattering assembly depicted in FIGS. 8A, 8B, and 8C using a single shot method, according to one or more embodiments described herein.
Figure 11B:
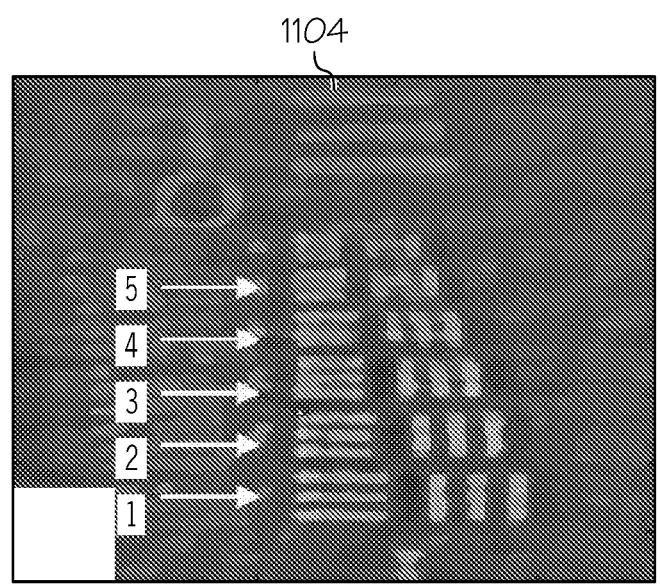
FIG. 11B depicts a second image of the resolution mask taken using the scattering assembly depicted in FIGS. 8A, 8B, and 8C using a multi-shot method, according to one or more embodiments described herein.

To measure the resolution of the imaging system 100, a resolution mask was placed in the FOV of detector 108 and imaged in accordance with both the single shot and multi-shot methods described herein (with a distance $d_1$ being set to 1 cm). FIG. 11A depicts a first image 1102 formed using the single shot method, while FIG. 11B depicts a second image 1104 formed using the multi-shot method described herein. The numbers labeled 1-5 in the first image 1102 and the second image 1104 are the element number on the 1951 USAF resolution mask, standing for the strip width of 250, 223.2, 198.4, 176.7, and 157.7 μm, respectively. The first image 1102 shows that the single-shot method reconstructed strips with non-straight edges and blurry gaps between them. The second image 1104 shows that the multi-shot method reconstructed clearly defined strips with a resolution of ~176 μm. Furthermore, a clear "1" and "0" located at the top of only the second image 1104 indicates the improvement of the image quality in the multi-shot reconstruction by gaining additional information during the multi-shot acquisition process. As will be appreciated, the resolution of the imaging system 100 depends on the values of the first distance $d_1$ and the second distance $d_2$, as well as the scatterer size and the pixel size of the detector 108. In FIG. 11A, the first distance $d_1$ was set as 1 cm, in consideration of both the compactness of the experimental setup and easiness of the implementation. As described herein, reducing the distance $d_1$ results in a larger shift of the corresponding scattering patterns on the detector 108, which can further increase the resolution.

Figure 12A:
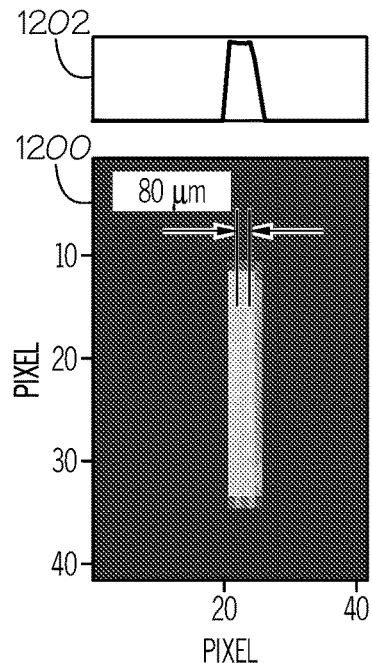
FIGS. 12A, 12B, and 12C depict simulated object images calculated using a first distance between the scattering assembly depicted in FIGS. 8A, 8B, and 8C and a dual strip pattern, with a plurality of different distances between the strips, according to one or more embodiments described herein.
Figure 12B:
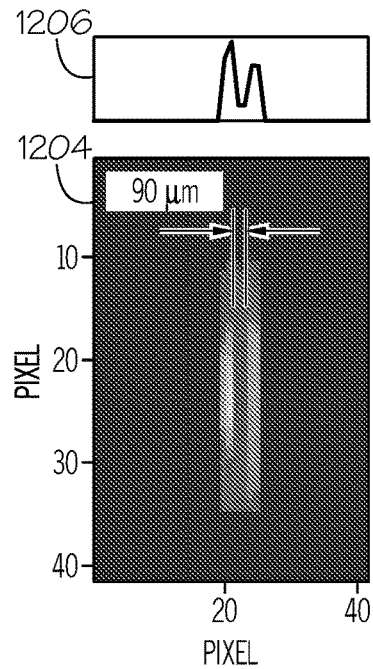
Figure 12C:
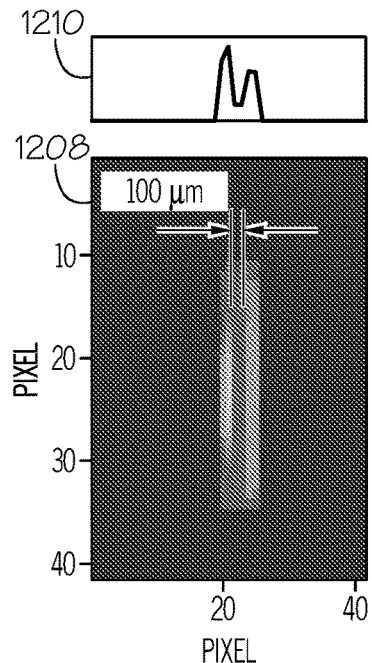
Figure 12D:
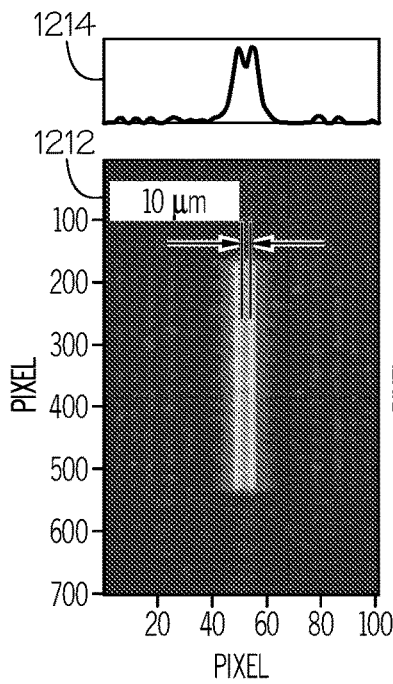
FIGS. 12D, 12E, and 12F depict simulated object images calculated using a second distance between the scattering assembly depicted in FIGS. 8A, 8B, and 8C and a dual strip pattern, with a plurality of different distances between the strips, according to one or more embodiments described herein.
Figure 12E:
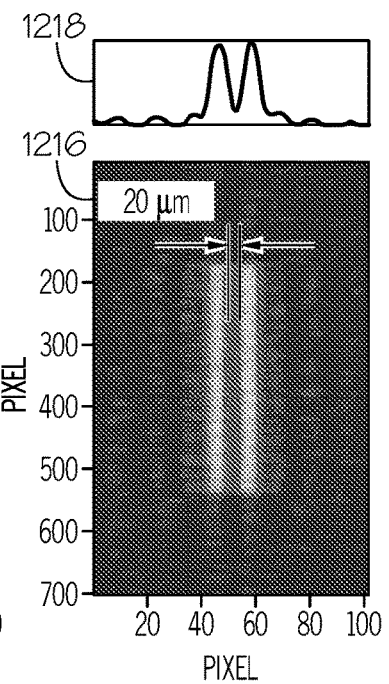
Figure 12F:
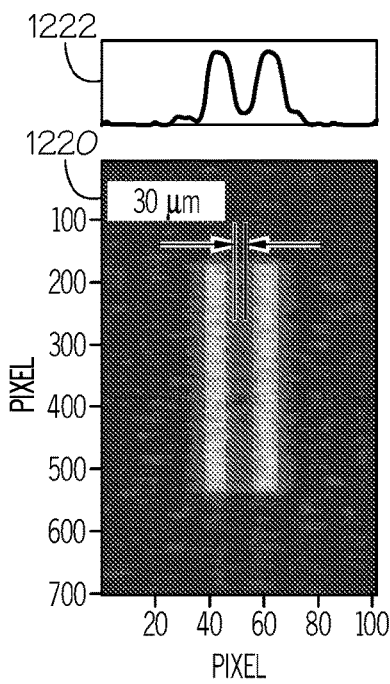

To further quantify the resolution of the imaging system 100, a test pattern formed by two strips was placed as the object 102 with a distance $d_1$ of 10.65 mm was numerically simulated. The distance between the strips was set at 80 μm, 90 μm, and 100 μm, respectively, and images were captured and reconstructed. FIG. 12A shows a simulated reconstructed image 1200 using the multi-shot method with the strips having a distance of 80 μm between them and a cross-sectional plot 1202 of the simulated reconstructed image 1200. FIG. 12B shows a simulated reconstructed image 1204 using the multi-shot method with the strips having a distance of 90 μm between them and a cross-sectional plot 1206 of the simulated reconstructed image 1204. FIG. 12C shows a simulated reconstructed image 1208 using the multi-shot method with the strips having a distance of 100 μm between them and a cross-sectional plot 1210 of the simulated reconstructed image 1208. An additional set of simulations was taken by altering the distance $d_1$ to 0.65 mm and setting the distance between the strips to one of 10 μm, 20 μm, and 30 μm, respectively. FIG. 12D shows a simulated reconstructed image 1212 using the multi-shot method with the strips having a distance of 10 μm between them and a cross-sectional plot 1214 of the simulated reconstructed image 1212. FIG. 12E shows a simulated reconstructed image 1216 using the multi-shot method with the strips having a distance of 20 μm between them and a cross-sectional plot 1206 of the simulated reconstructed image 1218. FIG. 12F shows a simulated reconstructed image 1220 using the multi-shot method with the strips having a distance of 30 μm between them and a cross-sectional plot 1222 of the simulated reconstructed image 1220.

The reconstructed images 1200, 1204, 1208, 1212, 1216, and 120 of FIGS. 12A-12F were reconstructed based on equations 2-5 described herein. For example, equations 2-4 were used to calculate a PSF (with a numerically-generated scattering mask S of the scattering assembly 800), which was convolved with a circular disk-shaped source having a diameter of 5 μm (for consistency with the optical fiber actually used as the point illumination source 104), and used conjunction with two-strip testing patterns to generate simulated reconstructed images thereof. The simulation used a value of 0.25 mm for the distance $d_2$ and a detector element size of 1.25 μm for the value $s_d$ described herein with respect to equation 5. As depicted in FIGS. 12A, 12B, and 12C, with the distance $d_1$ being 10.65 mm, the finest resolvable distance between the two strips is approximately 90 μm. As depicted in FIGS. 12D, 12E, and 12F, with the distance $d_1$ being 0.65 mm, the finest resolvable distance between the two strips is substantially less than the case $d_1=10.65$ mm. The resolution can be thus be increased by decreasing the distance $d_1$. The difference between this simulated value and the experimental result (depicted in FIGS. 11A and 11B) can be attributed to the experimental noises, such as camera noise, any experimental misalignment, and Brownian motion of the wires during the data acquisition process.

Figure 13A:
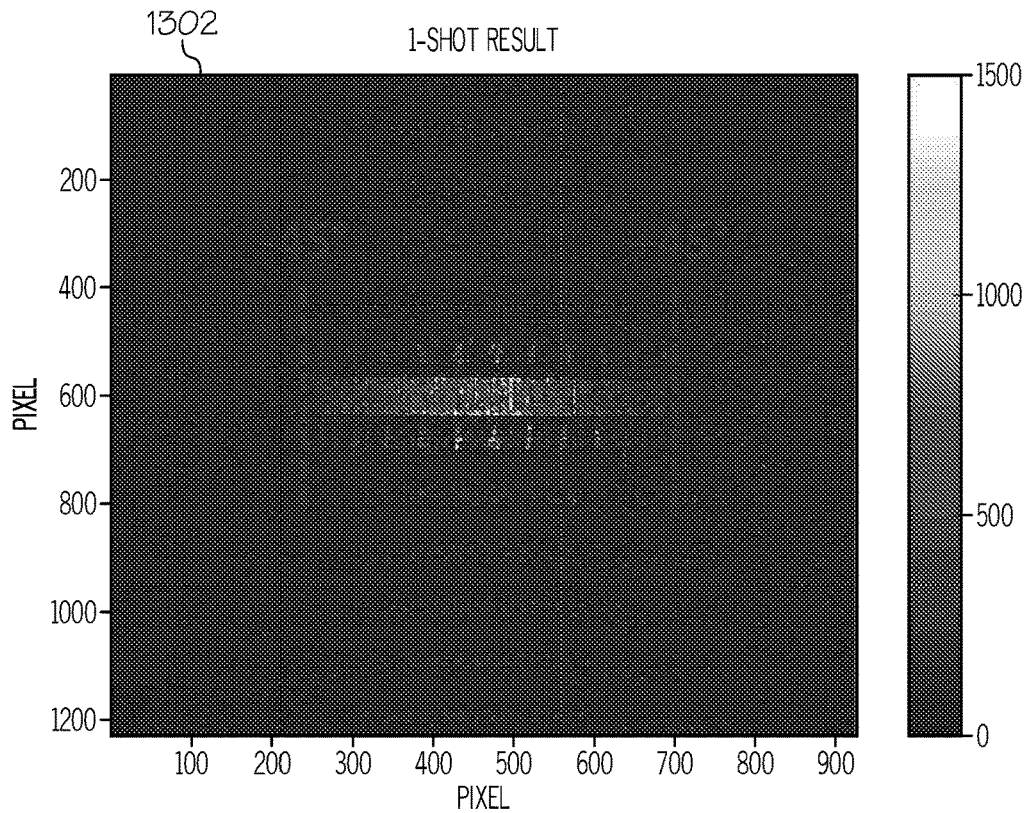
FIG. 13A depicts a first image of a 10 cm ruler generated using the scattering assembly depicted in FIGS. 8A, 8B, and 8C via a single shot method, according to one or more embodiments described herein.
Figure 13B:
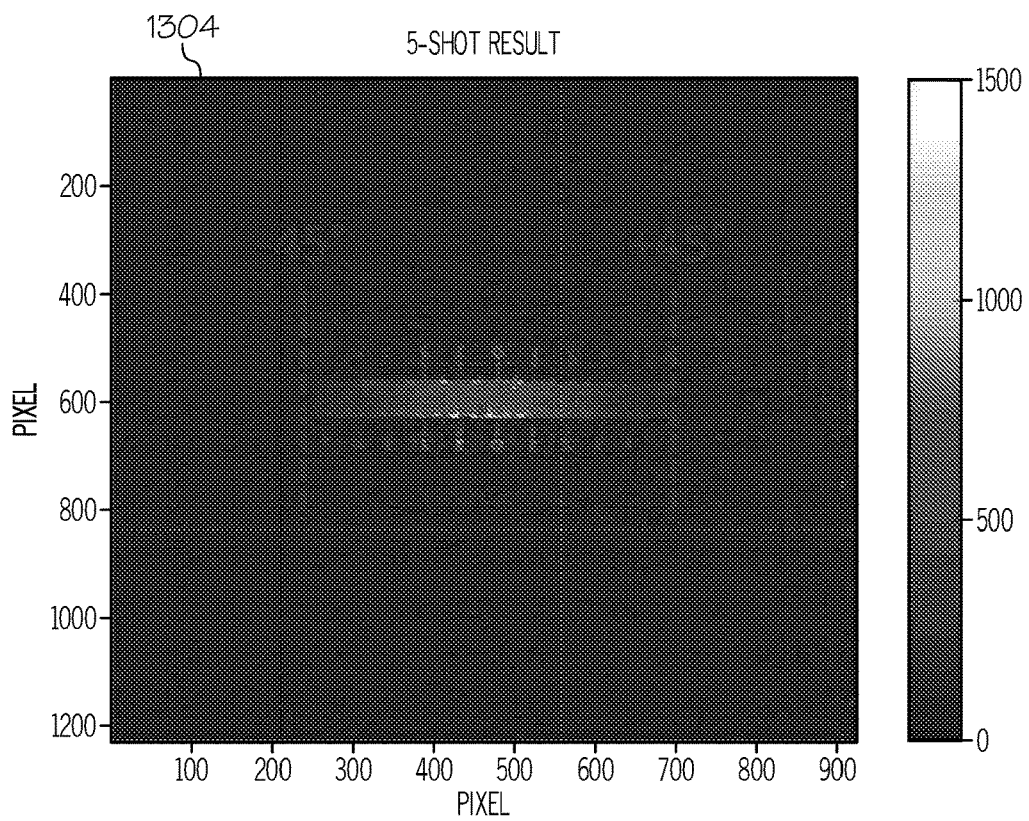
FIG. 13B depicts a second image of the 10 cm ruler generated using the scattering assembly depicted in FIGS. 8A, 8B, and 8C via a multi-shot method, according to one or more embodiments described herein.

To characterize the FOV of the imaging system 100 incorporating the scattering assembly 800 described herein, a 10 cm ruler was used as the object 102 and reconstructed using both the single shot and multi-shot methods described herein (using a distance $d_1$ of 1 cm). FIG. 13A depicts a first object image 1302 of the ruler reconstructed using the single shot method described herein. FIG. 13B depicts a second object image 1304 of the ruler reconstructed using the multi-shot method described herein. As shown, both the single shot and multi-shot methods achieved a field of view of about 45 degrees (e.g., 10 cm×10 cm) representing the significant improvement of FOV of the imaging system 100 over conventional focusing-based imaging systems (e.g., using reflective/dispersive optical elements).

It should now be understood that the systems and methods described herein comprise an imaging system including a scattering assembly and a detector. An object being imaged by the imaging system is placed a first distance from a scattering medium within the scattering assembly. The scattering medium may be a plurality of particles that can be manipulated in orientation, distribution, concentration and/or other properties via application of an electromagnetic field from at least one field source. The plurality of particles are placed a second distance from a detection plane of the detector. The scattering assembly includes a suspension medium and at least one field source capable of manipulating the plurality of particles such that adjusting the at least one field source places the scattering assembly into different scattering medium configurations where the particles form scattering elements that scatter object light incident thereon prior to the object light being incident on the detector. The scattering elements have sufficient scattering cross-sections to induce directional deviations in the object light that are dependent on the scattering medium configuration of the scattering assembly such that successive object image signals can be formed, with each object image signal having different object information. The imaging system is beneficially shift-invariant, facilitating reconstruction algorithms being used to reconstruct the object from the object image signals. A point illumination source may be used to illuminate the scattering assembly to generate point source image signals that are paired with the object image signals to reconstruct an image of the object. The imaging system is capable of generating high resolution images with a relatively high FOV.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An imaging system comprising:
a scattering assembly, the scattering assembly comprising:
a scattering medium positioned a first distance from an object to be imaged, the scattering medium comprising a plurality of particles suspended in a suspension medium; and
at least one field source generating an electromagnetic field to manipulate the plurality of particles;
a detector comprising a plurality of detector elements positioned a second distance from the scattering medium;
an image processing system configured to reconstruct an image of the object from an object image signal generated by the detector using object light scattered by the scattering medium and incident on the detector, and
an illumination optical system, the illumination optical system comprising:
an object subsystem having the object positioned therein;
a point illumination subsystem comprising a point illumination light source emitting the point illumination light; and
an optical element combining the object subsystem and the point illumination subsystem,
wherein: the object light from the object propagates through the object subsystem to a location on the optical element and the point illumination light propagates through the point illumination subsystem to the location on the optical element, and
the location is separated from the scattering assembly by the first distance in the light propagation direction.

2. The imaging system according to claim 1, wherein the electromagnetic field generated by the at least one field source is configured to manipulate at least one of an orientation, a concentration, and a spatial distribution of the plurality of particles within the suspension medium.

3. The imaging system according to claim 1, wherein the point illumination source is positioned in an object plane extending perpendicular to a light propagation direction.

4. The imaging system according to claim 1, wherein the point illumination source comprises:
a dimension in the object plane that is less than or equal to 100 µm; or
a tip of an optical fiber, the optical fiber having a core comprising a core diameter of less than or equal to 100 µm; or
a point of focus of the illumination light originating from an external light source.

5. The imaging system according to claim 1, wherein:
the first distance is greater than or equal to the second distance; or
the first distance is less than or equal to 1 mm; or
the first distance is less than or equal to 100 µm.

6. An imaging system comprising:
a scattering assembly, the scattering assembly comprising:
a scattering medium positioned a first distance from an object to be imaged, the scattering medium comprising a plurality of particles suspended in a suspension medium; and
at least one field source generating an electromagnetic field to manipulate the plurality of particles;
a detector comprising a plurality of detector elements positioned a second distance from the scattering medium;
an image processing system configured to reconstruct an image of the object from an object image signal generated by the detector using object light scattered by the scattering medium and incident on the detector, wherein the plurality of particles comprises a plurality of nanowires, each of the nanowires comprising a wire axis, a length in a direction of the wire axis, and a diameter, the diameter being less than the length.

7. The imaging system according to claim 6, wherein the electromagnetic field from the at least one field source orients at least a portion of the plurality of nanowires such that the wire axes of the portion of the plurality of nanowires are aligned along a preferred direction.

8. The imaging system according to claim 7, wherein the electromagnetic field from the at least one field source causes the portion of the plurality of nanowires to self-assemble into scattering elements.

9. The imaging system according to claim 1, wherein:
the plurality of particles are constructed from a metallic material; or
the plurality of particles comprise a coating constructed from an insulating material; or
the plurality of particles are constructed from a semiconducting material; or
the plurality of particles comprises particles having shapes selected from a group consisting of a wire, a sphere, a plate, a planar sheet, or any combination thereof.

10. The imaging system according to claim 1, wherein the electromagnetic field generated by the at least one field source is adjustable in at least one of a magnitude, a frequency, a waveform, and an orientation relative to the light propagation direction.

11. The imaging system according to claim 10, wherein the at least one field source comprises:
a first pair of electrodes having a first electrode orientation relative to the light propagation direction; and
a power source applying a time-varying voltage differential across the first pair of electrodes to generate a time-varying electric field extending through the suspension medium.

12. The imaging system according to claim 11, wherein the at least one field source further comprises a second pair of electrodes having a second electrode orientation relative to the light propagation direction, the second pair of electrodes receiving the time-varying voltage differential from the power source.

13. The imaging system according to claim 12, wherein surface normals of each electrode of the first pair of electrodes extend in a first direction perpendicular to the light propagation direction and surface normals of each electrode of the second pair of electrodes extend in a second direction perpendicular to the light propagation direction.

14. The imaging system according to claim 13, wherein the power source sequentially applies the time-varying voltage differential across the first pair of electrodes and the second pair electrodes to change a scattering medium configuration of the scattering assembly between capturing object image signals.

15. An imaging system comprising:
a scattering assembly, the scattering assembly comprising:
a scattering medium positioned a first distance from an object to be imaged, the scattering medium comprising a plurality of particles suspended in a suspension medium; and
at least one field source generating an electromagnetic field to manipulate the plurality of particles;
a detector comprising a plurality of detector elements positioned a second distance from the scattering medium;
an image processing system configured to reconstruct an image of the object from an object image signal generated by the detector using object light scattered by the scattering medium and incident on the detector,
wherein the image processing system is configured to reconstruct the image of the object from a plurality of object image signal-point source image signal pairs using a multi-shot reconstruction method, at least two of the plurality of object image signal-point source image signal pairs being generated with the scattering assembly being in a different scattering medium configuration.

16. An imaging system comprising:
a scattering assembly, the scattering assembly comprising:
a scattering medium positioned a first distance from an object to be imaged, the scattering medium comprising a plurality of particles suspended in a suspension medium; and
at least one field source generating an electromagnetic field to manipulate the plurality of particles;
a detector comprising a plurality of detector elements positioned a second distance from the scattering medium;
an image processing system configured to reconstruct an image of the object from an object image signal generated by the detector using object light scattered by the scattering medium and incident on the detector; and
an imaging optical element mapping the object light onto the detector, the imaging optical element being disposed between the detector and the object along a light propagation direction.

17. An imaging system comprising:
a scattering assembly, the scattering assembly comprising:
a scattering medium positioned a first distance from an object to be imaged, the scattering medium comprising a plurality of particles suspended in a suspension medium; and
at least one field source generating an electromagnetic field to manipulate the plurality of particles;
a detector comprising a plurality of detector elements positioned a second distance from the scattering medium;
an image processing system configured to reconstruct an image of the object from an object image signal generated by the detector using object light scattered by the scattering medium and incident on the detector,
wherein:
the detector and the object are both disposed on a first side of the scattering assembly, and
object light scattered by the scattering medium backscatters off the scattering medium towards the detector.

18. A method of generating an image of an object, the method comprising:
placing the object within a field of view of an imaging system, the imaging system comprising:
a scattering assembly comprising a scattering medium in a first scattering medium configuration, the scattering medium positioned a first distance from the object along a light propagation direction, the scattering medium comprising a plurality of particles suspended in a suspension medium and at least one field source; and a detector, the detector positioned a second distance from the scattering medium along the light propagation direction, the detector comprising a plurality of detector elements, and an illumination optical system, the illumination optical system comprising:
- an object subsystem having the object positioned therein;
- a point illumination subsystem comprising a point illumination light source emitting the point illumination light; and
- an optical element combining the object subsystem and the point illumination subsystem,
- wherein: the object light from the object propagates through the object subsystem to a location on the optical element and the point illumination light propagates through the point illumination subsystem to the location on the optical element, and
- the location is separated from the scattering assembly by the first distance in the light propagation direction;

scattering object light from the object in the scattering medium while the scattering medium is in the first scattering medium configuration;

measuring the scattered object light with the detector to generate a first object image signal;

illuminating the scattering assembly with point illumination light from a point illumination source while the scattering medium is in the first scattering medium configuration;

measuring scattered point illumination light with the detector to generate a first point source image signal, wherein the first object image signal and the first point source image signal form a first object image signal-point source image signal pair; and reconstructing the image of the object using the first object image signal with the first point source image signal.

19. A method of generating an image of an object, the method comprising:
placing the object within a field of view of an imaging system, the imaging system comprising:

a scattering assembly comprising a scattering medium positioned a first distance from the object along a light propagation direction, the scattering medium comprising a plurality of particles suspended in a suspension medium; and a detector, the detector positioned a second distance from the scattering medium along the light propagation direction, the detector comprising a plurality of detector elements, and an illumination optical system, the illumination optical system comprising:
- an object subsystem having the object positioned therein;
- a point illumination subsystem comprising a point illumination light source emitting the point illumination light; and
- an optical element combining the object subsystem and the point illumination subsystem,
- wherein: the object light from the object propagates through the object subsystem to a location on the optical element and the point illumination light propagates through the point illumination subsystem to the location on the optical element, and
- the location is separated from the scattering assembly by the first distance in the light propagation direction;

scattering object light from the object in the scattering medium while the scattering medium is in a plurality of different scattering medium configurations and measuring scattered object light from each of the scattering medium configurations to generate a plurality of object image signals;

with the scattering medium in each of the plurality of different scattering medium configurations, illuminating the scattering assembly with point illumination light from a point illumination source to generate a plurality of point source image signals; and reconstructing the image of the object from the plurality of object image signals and the plurality of point source image signals using a multi-shot method.

* * * * *